(12) United States Patent
Edge

(10) Patent No.: US 7,215,343 B2
(45) Date of Patent: May 8, 2007

(54) COLOR CORRECTION USING A DEVICE-DEPENDENT DISPLAY PROFILE

(75) Inventor: Christopher J. Edge, St. Paul, MN (US)

(73) Assignee: Eastman Kodak Company, Rochester, NY (US)

( * ) Notice: Subject to any disclaimer, the term of this patent is extended or adjusted under 35 U.S.C. 154(b) by 71 days.

(21) Appl. No.: 10/767,987

(22) Filed: Jan. 29, 2004

(65) Prior Publication Data

US 2004/0183813 A1   Sep. 23, 2004

Related U.S. Application Data

(60) Provisional application No. 60/443,939, filed on Jan. 30, 2003.

(51) Int. Cl.
G09G 5/02 (2006.01)
G03F 3/08 (2006.01)

(52) U.S. Cl. .................................. 345/604; 358/518

(58) Field of Classification Search ........ 345/600–604; 382/167, 162, 274; 358/1.9, 518
See application file for complete search history.

(56) References Cited

U.S. PATENT DOCUMENTS

| | | |
|---|---|---|
| 4,500,919 A | 2/1985 | Schreiber |
| 4,926,254 A | 5/1990 | Nakatsuka et al. |
| 4,958,220 A | 9/1990 | Alessi et al. |
| 5,027,196 A | 6/1991 | Ono et al. |
| 5,185,850 A * | 2/1993 | Usui et al. .................... 706/17 |
| 5,371,537 A | 12/1994 | Bohan et al. |
| 5,381,349 A | 1/1995 | Winter et al. |
| 5,512,961 A | 4/1996 | Cappels, Sr. |
| 5,638,117 A | 6/1997 | Engeldrum et al. |
| 5,710,872 A * | 1/1998 | Takahashi et al. ............ 358/1.9 |
| 5,739,809 A | 4/1998 | McLaughlin et al. |
| 5,754,682 A * | 5/1998 | Katoh .......................... 382/162 |
| 5,781,206 A | 7/1998 | Edge |
| 5,877,787 A | 3/1999 | Edge |
| 5,907,667 A | 5/1999 | Shiraishi |
| 6,005,968 A * | 12/1999 | Granger ....................... 382/162 |
| 6,008,836 A | 12/1999 | Bruck et al. |
| 6,027,201 A | 2/2000 | Edge |
| 6,043,909 A | 3/2000 | Holub |
| 6,091,518 A | 7/2000 | Anabuki |
| 6,229,916 B1 | 5/2001 | Ohkubo |

(Continued)

FOREIGN PATENT DOCUMENTS

EP    1 307 042 A    5/2003

(Continued)

OTHER PUBLICATIONS

International Search Report for International Application No. PCT/US04/002364, filed Jan. 29, 2004.

(Continued)

*Primary Examiner*—Matthew Luu
(74) *Attorney, Agent, or Firm*—Shumaker & Sieffert

(57) ABSTRACT

A method includes obtaining a chromatic correction for a display device based on a device-dependent display profile. The method may ensure that images that appear on a display device in a soft proofing environment will be visually equivalent to images that appear on print media.

7 Claims, 12 Drawing Sheets

U.S. PATENT DOCUMENTS

| | | | |
|---|---|---|---|
| 6,340,975 | B2 | 1/2002 | Marsden et al. |
| 6,459,425 | B1 * | 10/2002 | Holub et al. ............... 345/207 |
| 6,522,313 | B1 | 2/2003 | Cottone |
| 6,594,388 | B1 * | 7/2003 | Gindele et al. ............ 382/167 |
| 2002/0167528 | A1 | 11/2002 | Edge |
| 2002/0196350 | A1 * | 12/2002 | J. Cooper ............... 348/223.1 |

FOREIGN PATENT DOCUMENTS

| | | |
|---|---|---|
| JP | 10-224643 | 8/1998 |
| JP | 11232073 | 8/1999 |
| WO | WO 98/15091 | 4/1998 |
| WO | WO 00/29935 | 5/2000 |
| WO | WO 2000JP00174 | 7/2000 |

OTHER PUBLICATIONS

Braun et al., "Physchophysical Generation of Matching Images for Cross-Media Color Reproduction", Final Program and Proceedings of IS&T/SID Fourth Color Imaging Conference: Color Science, Systems and Applications, Proceedings of the Fourth Color Imaging Conference: Color Science, Systems and Applications, Scottdale, AZ, pp. 214-220, Nov. 19-22, 1996.

"Adobe Photoshop 5.0 User Guide—Reproducing Color Accurately," Adobe Systems Incorporated, pp. 79-101, 1998.

Using Adobe Gamma—Technical Guides, Version 3.0, copyright 2000.

E-Color, Inc., "True Internet Color Assures Online Color Accuracy for e-Commerce Applications," 10 pgs., no date available.

Fox et al., *Computer Networks and ISDN Systems*, 1996, 28(7-11): 1445-1456.

Praxisoft Brochure, entitled "Introducing REALNETCOLORtm," no date available.

Praxisoft: Color Matching Solutions—Internet Solutions—REALNETCOLORtm, no date available.

Press Release—True Internet Color Patent Filings—in True Internet Color(r), E-Color, Incorporated Apr. 2000.

Mark D. Fairchild, Color Appearance Models, pp. 188-189, Addison-Wesley 1998.

* cited by examiner

COLOR CORRECTION USING A DEVICE-DEPENDENT DISPLAY PROFILE

This application claims priority from U.S. Provisional Application Ser. No. 60/443,939, filed Jan. 30, 2003, the entire content of which is incorporated herein by reference.

FIELD

The invention relates to color imaging and, more particularly, to techniques for presentation of color images on display devices.

BACKGROUND

Color imaging devices use combinations of different device-dependent coordinates to form color images for display or printout on media such as paper or film. Many hardcopy printing devices use combinations of cyan, magenta, yellow, and black (CMYK) to form color imagery. These device-dependent coordinates of C, M, Y and K may be combined to form a gamut of colorimetric values that the device is capable of producing. Display devices, such as cathode ray tubes (CRTs) or flat panel monitors, may use the device-dependent coordinates of red, green, and blue (RGB). Some high-fidelity color imaging devices may use the device-dependent coordinates cyan, magenta, yellow, and black in combination with other coordinates such as orange and green. These and other device-dependent coordinate systems have been developed for use with various color imaging devices.

Many different device-independent coordinate systems have been developed in an attempt to standardize color specification across different devices. For instance, the Commission Internationale de l'Eclairage (CIE) has developed device-independent color spaces such as the L*a*b* color space (hereafter L*a*b* color space, L*a*b* space, or simply L*a*b*) and the XYZ color space (hereafter XYZ color space, XYZ space, or simply XYZ). Moreover, several other organizations and individuals have developed other device-independent color spaces.

A point in a device-independent color space theoretically defines a color value irrespective of any particular device coordinates. A point in L*a*b* space or XYZ space, for instance, can be mapped to a point in a device gamut. That point in the device gamut, in turn, defines the device-dependent coordinates that will theoretically cause the device to produce a color that is visually equivalent to that defined by the point in L*a*b* space or XYZ space.

The term "soft proofing" refers to a proofing process that makes use of a display device rather than a printed hard copy. Traditionally, color proofing techniques have relied on "hard copy proofing," where proofs are printed out on paper or other print media and inspected to ensure that the images and colors look visually correct. For instance, color characteristics can be adjusted and successive hard copy prints can be examined in the hard copy proofing process. After determining that a particular proof is acceptable, the color characteristics used to make the acceptable proof can be reused to mass-produce, e.g., on a printing press, large quantities of print media that look visually equivalent to the acceptable proof.

Soft proofing is highly desirable for many reasons. For instance, soft proofing can remove the need to print copies of the media during the proofing process. Moreover, soft proofing may allow multiple proofing specialists to proof color images from remote locations simply by looking at display devices, rather than awaiting delivery of hard copies. Soft proofing can be faster and more convenient than hard proofing. Moreover, soft proofing can reduce the cost of the proofing process. For these and other reasons, soft proofing is highly desirable.

A major problem with soft proofing, however, is the difficulty in achieving a good visual match between the colors displayed on the soft proofing display device and the colors that appear on the actual printed hard copy. As mentioned above, device-independent coordinates theoretically standardize color specification. Thus, theoretically the CMYK device coordinates of a hard copy printout could be converted to device-independent coordinates and then converted to RGB device coordinates. Also, theoretically the colors displayed using the RGB device coordinates would be visually equivalent to those of the hard copy print out. In reality, however, the colors that appear on the display may look different than those of the hard copy printout, even though the images displayed by the soft and hard copy media produce substantially identical device-independent values. Soft proofing cannot work effectively, and gain widespread adoption in the industry, if the colors on the soft proofing display device do not provide an acceptable visual match with the colors on hard copy printouts.

SUMMARY

In one embodiment a method comprises applying selective chromaticity corrections to device-independent coordinates using at least one piecewise linear correction function.

The piecewise linear correction function may operates on linear device-dependent coordinates associated with an output device.

The method may further comprise providing a group of piecewise linear correction functions, each group corresponding to a different region of color in a device-dependent coordinate space associated with an output device and applying each group of piecewise linear correction functions to the device-independent coordinates in the corresponding regions of color to perform chromaticity corrections to the device-independent coordinates.

In another embodiment, a method comprises applying selective chromaticity corrections to device-independent coordinates that define colors in a visually non-uniform color space, wherein the chromaticity corrections are based on linear correction functions of linear device-dependent coordinates, and wherein the chromaticity corrections are applied to device-independent coordinates in a piecewise fashion between color boundaries to produce chromatically corrected device-independent coordinates.

In another embodiment, a method comprises determining chromaticity corrections to device-independent coordinates corresponding to each region of color in a device-dependent coordinate space based on linear device-dependent coordinates and applying the chromaticity corrections to the device-independent coordinates in the corresponding regions of color to obtain corrected device-independent coordinates.

Determining chromaticity corrections may further comprises calculating correction factors corresponding to each region of color that are piecewise linear correction functions within the corresponding regions of color.

In another embodiment, a method comprises determining a correction level based on desired changes in saturation, hue and brightness for chromatic colors of a device-dependent color space associated with a display device, calculating a correction factor based on a linear correction function associated with the display device, and applying the correction factor and the correction level to device-independent coordinates that define chromatic colors of a printing device to produce chromatically corrected device-independent coordinates.

In another embodiment, a system comprises a display device; and a processor coupled to the display, wherein the processor applies selective chromaticity corrections to device-independent coordinates using at least one piecewise linear correction function.

In another embodiment, a system comprises a printing device, a display device and a processor coupled to the printing device and the display device, wherein the processor converts device-dependent coordinates that define a color in the printing device to device-independent coordinates, applies chromaticity corrections to the device-independent coordinates based on a linear correction function of device-dependent coordinates associated with the printing device to produce corrected device-independent coordinates, and converts the corrected device-independent coordinates to device-dependent coordinates that define a color in a display device associated with the device-dependent display profile.

In another embodiment, the invention comprises a computer-readable medium containing instructions for causing a processor to receive a white point correction for a display device, determine chromaticity corrections to device-independent coordinates corresponding to each region of color in a device-dependent coordinate space based on linear device-dependent coordinates, apply the white point correction to the device-independent coordinates, and apply the chromaticity corrections to the device-independent coordinates in the corresponding regions of color to obtain corrected device-independent coordinates.

In another embodiment, the invention comprises a computer-readable medium containing instructions for causing a processor to convert device-dependent coordinates that define a color in a printing device to device-independent coordinates, apply chromaticity corrections to the device-independent coordinates based on a linear correction function of device-dependent coordinates associated with the printing device to produce corrected device-independent coordinates, and convert the corrected device-independent coordinates to device-dependent coordinates that define a color in a display device associated with the device-dependent display profile.

In still other embodiments, a method comprises obtaining a white point correction for a display device, obtaining a first chromatic correction for the display device by determining a chromatic correction matrix, generating first corrected device-independent coordinates based on the white point correction and the first chromatic correction, determining a second chromatic correction to the first set of corrected device-independent coordinates based on a linear correction function, and applying the second chromatic correction to the first corrected device-independent coordinates to produce second corrected device-independent coordinates.

Additional details of these and other embodiments are set forth in the accompanying drawings and the description below. Other features, objects and advantages will become apparent from the description and drawings, and from the claims.

DETAILED DESCRIPTION

Figure 1:
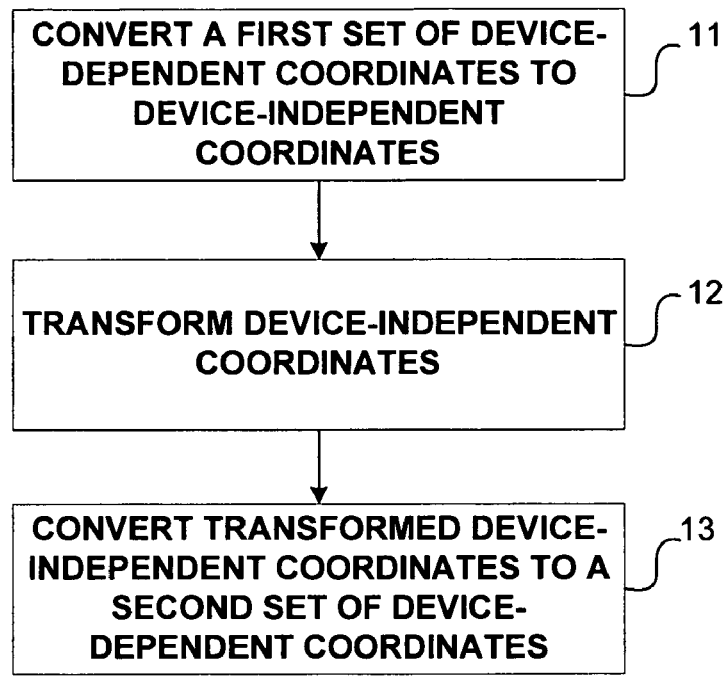
FIGS. 1–5 are flow diagrams according to embodiments of the invention.

In exemplary embodiments, the invention comprises methods, systems and computer readable media carrying program code that facilitate soft proofing. The invention may implement one or more transformation techniques to transform color coordinates between hard copy and soft copy proofing environments. The transformation techniques ensure that color images that appear on a display device will be a visually acceptable match to color images that appear on print media.

The ultimate goal of soft proofing technology is to facilitate the accurate rendering of color images on a display device. In other words, soft proofing technology seeks to display color images on a display device that are a "visually acceptable match," "visually equivalent," or a "good visual match" to color images on print media. Two images are "visually equivalent" if their empirical delta E error is approximately equal to, or less than 1. A good visual match occurs when a person trained in color management cannot visually identify a difference between the color values of two color images. A visually acceptable match is a match that is acceptable in a soft proofing environment.

As mentioned, two images are "visually equivalent" if their empirical delta E error is approximately equal to, or less than 1. By way of example, the value of empirical delta E can be determined for a single color by displaying an RGB color on a CRT. A hard copy of the color can be placed adjacent to the CRT for comparison. Several operators trained in color management can compare the color on the hard copy to that on the CRT, and can adjust the RGB value of the color on the CRT so the color on the CRT matches that of the hard copy. If necessary, effects of scattered light can be eliminated by viewing and comparing the two colors through a telescopic-like tube. If the average of the corrections determined by the operators is near zero for R, G, and B, the CRT and hard copy colors may be said to have an empirical delta E that is near zero. If the average deltas are non-zero, the empirical delta E can be determined by converting RGB to L*a*b* using the display ICC profile for the original RGB and the average adjusted RGB. The delta E can then be computed from the L*a*b* values.

Imaging devices include printing devices and display devices. Printing devices may include, for example, laser printers, ink jet printers, thermal imagers, dot matrix printers, printing presses or any other device capable of printing to tangible media such as paper or film. Display devices include cathode ray tubes (CRTs), liquid crystal displays (LCDs) and other flat screen displays, digital paper, electronic ink displays, and any other device capable of rendering images from electronic input signals or data.

Typically, printing devices and display devices both make use of device-dependent coordinates to define color. Printing devices, for instance, typically use CMYK or CMYKOG coordinates to define color, and therefore, printing devices may have an associated CMYK gamut or CMYKOG gamut defining the color capabilities of the printing device. Many display devices currently use RGB coordinates to define color, and therefore, typically have an associated RGB gamut that defines the color capabilities of the display device. A CRT display device, for instance, makes use of different combinations of red, green and blue phosphors that can display colors within the RGB gamut of the device.

The visual appearance of a color, however, is also dependent on illuminant conditions. For instance, the same printout may look different when viewed under different lighting. For this reason, the illuminant condition is generally a fixed variable when comparing colors defined by one or more color spaces. The illuminant condition is important in both hard copy and soft proofing environments.

Experimental research has uncovered an apparent breakdown in color science as defined by the CIE standards. In particular, a display device and printing device can produce color images that have the same measured XYZ coordinates, yet the images can look visually different. For example, CRT displays that are calibrated to a D50 illuminant condition look yellow when compared to printed images with the same XYZ coordinates viewed in a D50 illuminant condition.

Theoretically, images with the same measured XYZ coordinates should appear to be identical. Unfortunately, it appears that this is not necessarily the case for a visual comparison of hard copy and soft images. Thus, to achieve color matching between images on a display device and images printed on hard copy media that is of "proofing quality," i.e., a visually acceptable match, visually equivalent or a good visual match, transformation of the XYZ coordinates in accordance with the invention may be necessary.

First Method Transformation

A first method transformation for transforming color coordinates between hard copy and soft copy proofing environments will now be described. This first method transformation is also described in the copending and commonly assigned U.S. patent application Ser. No. 09/808,875, filed Mar. 15, 2001, the entire content of which is incorporated herein by reference. The first method transformation techniques may be used in combination with the second method transformation techniques described herein below to ensure that color images that appear on a display device will be a visually acceptable match to color images that appear on print media.

FIG. 1 is a flow diagram illustrating a first method transformation process according to an embodiment of the invention. As shown in FIG. 1, a first set of device-dependent coordinates are converted to device-independent coordinates (11). The device-independent coordinates are then transformed (12). The transformed device-independent coordinates are then converted to a second set of device-dependent coordinates (13). The process of FIG. 1, for instance, can be performed on all of the pixels in a color image so that the output of a second imaging device, e.g., a display, looks visually equivalent to the output of a first imaging device, e.g., a printer.

Figure 2:
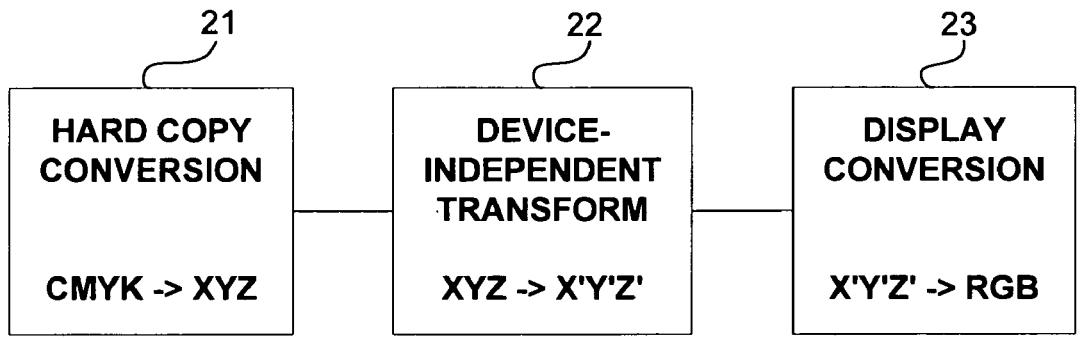

FIG. 2 is a flow diagram illustrating one implementation of the first method transformation process of FIG. 1. As shown, the image data of a hard copy CMYK image is converted from CMYK coordinates to XYZ coordinates (21). The XYZ coordinates are then transformed to X'Y'Z' (22). These transformed X'Y'Z' coordinates can then be converted to RGB coordinates (23) for presentation on a display device for soft proofing. In this manner, the output of a display device using the RGB coordinates can be made to be visually equivalent to a hard copy printed with the CMYK coordinates.

Figure 3:
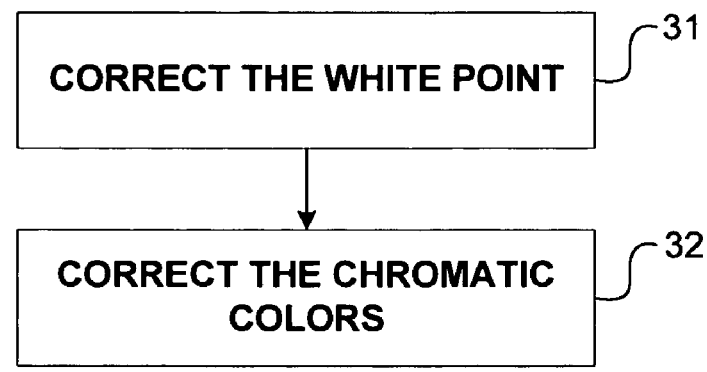

FIG. 3 is a flow diagram of a general process that can be implemented to transform device-independent coordinates. As shown, a white point is corrected (31) and then chromatic colors are corrected (32). Bifurcating the transformation process in this manner can yield accurate color matching results.

Referring again to FIG. 1, the first set of device-independent coordinates may be associated with a first device. For instance, the first device may be printer that prints color images according to a CMYK gamut. The color image may be comprised of a collection of device-dependent coordinates that define the colors of the points in the image.

For example, an image may be comprised of image data that includes a large collection of CMYK coordinates. Each of these coordinates can be converted to device-independent coordinates (11), and then transformed (12). Each transformed coordinate may then be converted to form a second set of device-dependent coordinates (13).

The second set of device-dependent coordinates, for example, may be associated with a second imaging device. For instance, if the second imaging device is a display device such as a CRT, the second set of device-dependent coordinates may be a collection of RGB coordinates. Each RGB coordinate can be generated from the transformed coordinates.

The transformation operation (12) is important in obtaining accurate color matching. Transformation (12) adjusts device-independent coordinates to ensure that the output on a display device, for example, looks substantially the same as the print out of a printer. While this transformation may be "theoretically" unnecessary, given the widely-accepted CIE color equations, the general breakdown in color science discussed above mandates the use of this transformation, especially in the field of soft proofing where color matching is critical. Thus, the invention compensates for color matching deficiencies that arise in the conventional XYZ transformations in the context of hard copy to soft copy matching.

Referring again to FIG. 3, a bifurcated transformation of device-independent coordinates is illustrated. By way of example, the white point of a display device can be corrected (31) by starting with a known illuminant condition such as D50. For instance, a white surface can be placed in a viewing booth having D50 lighting to define a white point. Reflectance of the white surface can be measured in terms of device-independent coordinates such as L*a*b*. At this point, a white area with the same L*a*b* values can be created and displayed on a display device using commercially available software such as Adobe® PhotoShop®, available from Adobe Systems, Inc. of San Jose, Calif. Next, the x and y chromaticities of the white point on the display device can be adjusted until the white image on the display device and the white image in the viewing booth are either visually equivalent, a good visual match, or a visually acceptable match. The adjustments to the x and y chromaticities of the white point should be noted. Having made the adjustments, the display device may be categorized as being calibrated to a "visual D50" white point. In this case, the white points presented by the display and hard copy produce slightly different XYZ values, but appear to be a visual match.

After correcting the white point (31), the chromatic colors may be corrected (32). The correction to the chromatic colors, for example, may be categorized as a correction to the saturated colors in the device gamut. For instance, if the correction is being applied to a CRT defined by an RGB gamut, the correction to the chromatic colors may be an adjustment to the R, G, and B chromaticities.

In one example, the correction to the chromatic colors involves first determining correction values. To do this, a CMYK image should be converted to digital form. For example, a CMYK image can be converted to AdobeRGB (D50) using absolute rendering intent with an accurate Matchprint™ profile as measured by a spectrophotometer, i.e., a profile for the output of an Imation Matchprint™ laser proofer commercially available from Imation Corp. of Oakdale, Minn. Optimally, the image used for comparison should contain 100% solids and overprints of C, M, Y, R (e.g., M+Y), G (e.g., C+Y), and B (e.g., C+M), although the invention is not limited in that respect. At this point, the RGB working space should be set to AdobeRGB(D50). The digital image can be compared to the CMYK Matchprint™ hard copy in a viewing station and the R, G, and B chromaticities of the AdobeRGB(D50) working space can be adjusted until either a visually acceptable match or a good visual match is achieved, or until the two images are visually equivalent. Again, the adjustments to the R, G, and B chromaticities of the display device working space should be noted.

Figure 4:
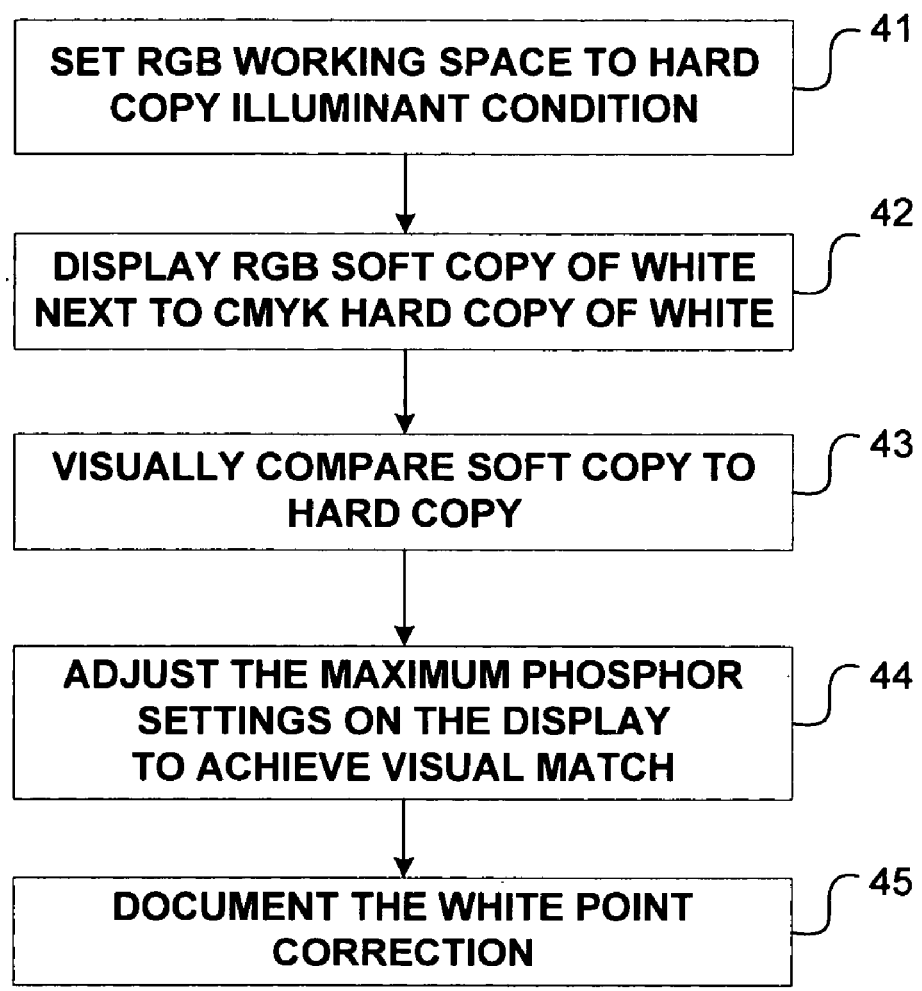

FIG. 4 is another flow diagram according to an embodiment of the invention. In particular, FIG. 4 illustrates one method that can be implemented to correct a white point in a soft proofing setting. As shown, an RGB working space is first set to the hard copy illuminant condition (41). Again, for example, the illuminant condition may be a D50 illuminant condition.

After setting the illuminant condition in the RGB working space (41), an RGB soft copy of white can be displayed next to a CMYK hard copy of white (42). For example, a white area with the same L*a*b* values as that of a white CMYK hard copy can be created in the RGB working space and displayed next to the CMYK hard copy. The illuminant condition illuminating the CMYK hard copy should still be D50. The soft copy of white can then be visually compared to the hard copy white (43).

Having compared the hard copy white to the soft copy white, the maximum phosphor settings on the display device can be adjusted to achieve a visual match between the hard copy and soft copy (44). The phosphor settings can be incrementally adjusted by a user, for instance, until the white that appears on the display looks the same as the white on the hard copy. Once a visual match of white is achieved, the amount of adjustment to the phosphor settings can be documented (45).

Figure 5:
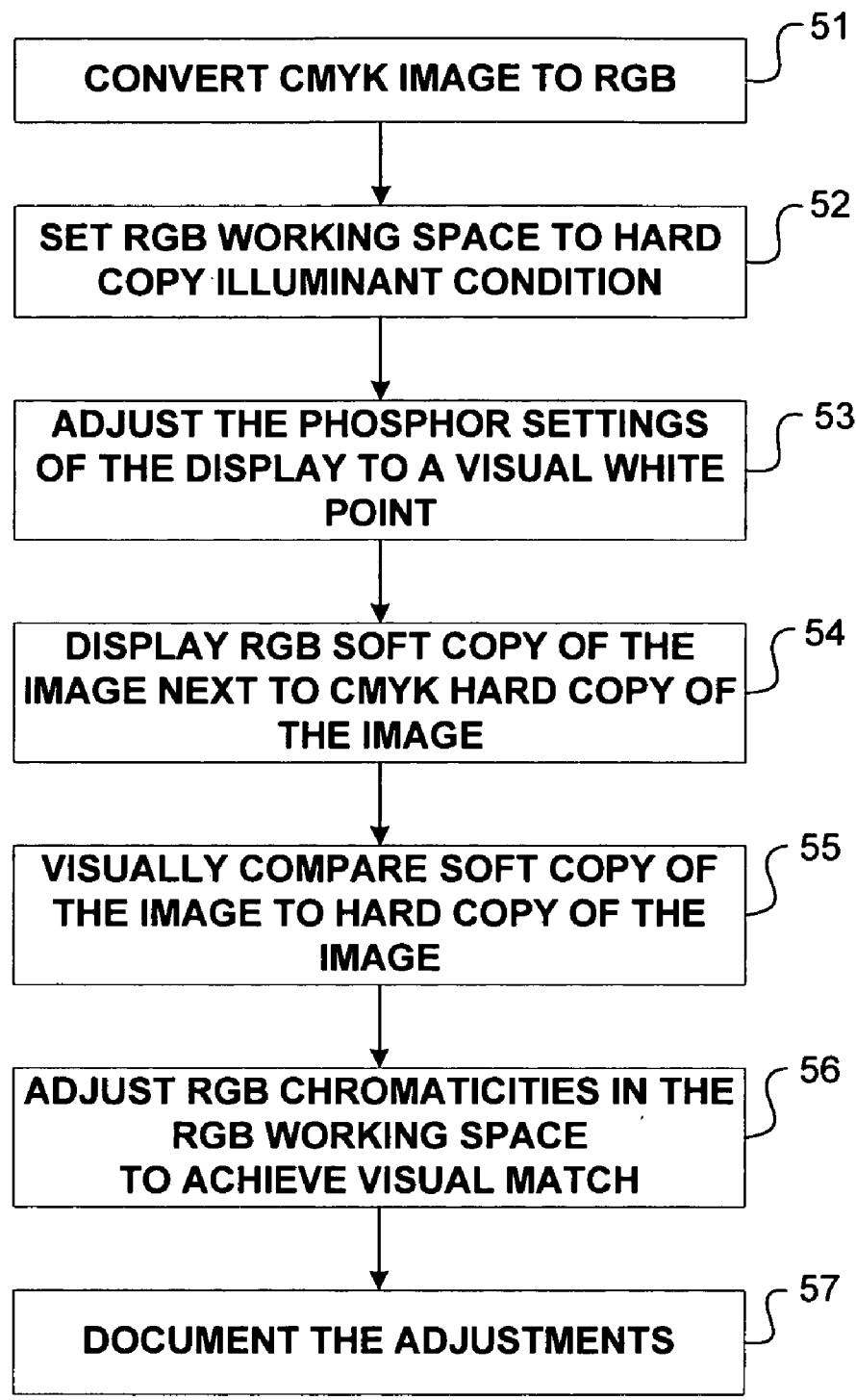

FIG. 5 is another flow diagram according to an embodiment of the invention. As shown, a CMYK image is converted to RGB coordinates (51). For example, a CMYK image can be converted to AdobeRGB(D50) using absolute rendering intent with an accurate Matchprint™ profile as measured by a spectrophotometer, i.e., a profile for the output of an Imation Matchprint™ laser proofer commercially available from Imation Corp. of Oakdale, Minn. Optimally, the image should contain 100% solids and overprints of C, M, Y, R, G, and B, although the invention is not limited in that respect.

After converting the CMYK image to RGB, the working space can be set according to the hard copy illuminant condition (52). For example if the hard copy illuminant condition is D50, the RGB working space should be set to AdobeRGB(D50). Once the working space is set (52), the phosphor settings of the display can be adjusted to correspond to a visual white point (53). FIG. 4, for example, illustrates an appropriate method for determining a visual white point of a display.

At this point, an RGB soft copy of the image can be displayed next to a CMYK hard copy of the image (54). Again, the CMYK hard copy should still be illuminated with a D50 illuminant. The hard copy of the image can then be visually compared to the soft copy of the image (55). A viewing station, for example, may be implemented to ensure that D50 illuminant conditions are achieved when the soft copy is compared to the hard copy.

The R, G, and B chromaticities of the AdobeRGB(D50) working space can be adjusted to achieve a visual match between the hard copy and the soft copy of the image (56). For instance, the chromaticities of the AdobeRGB(D50) working space can be incrementally adjusted by a user until the colors that appear on the display look the same as the colors on the hard copy. The adjustments to the chromaticities can then be documented (57).

Having determined and documented the corrections to the white point and the chromaticities, the transformation can be repeated by inputting the correction values into a mathematical framework as outlined below. Moreover, after performing the mathematical transformation from XYZ to X'Y'Z' outlined below, a new profile such as an ICC profile can be created to allow CMYK images rendered with the corrected ICC profile to look the same as the RGB images that were visually corrected by modifying the AdobeRGB chromaticities. An ICC profile would conform to existing specifications published by the International Color Consortium (ICC) for characterization of device characteristics.

One implementation of the first method transformation uses matrix algebra to realize very accurate matching results. The total resulting XYZ to X'Y'Z' correction transform can be described as follows:

$$\begin{pmatrix} X_{Corr} \\ Y_{Corr} \\ Z_{Corr} \end{pmatrix} = M_{Corr} \begin{pmatrix} X \\ Y \\ Z \end{pmatrix}$$

$$= M_1(\Delta x_{D50}, \Delta y_{D50}) M_2(\Delta x_r, \Delta y_r, \Delta x_g, \Delta y_g, \Delta x_b, \Delta y_b) \begin{pmatrix} X \\ Y \\ Z \end{pmatrix}$$

where the first matrix $M_1$ performs a correction to XYZ with regard to the white point and $M_2$ performs a correction to the chromaticities.

The $M_1$ correction effectively rescales the maximum R, G, and B intensities of phosphors in a display device such that the white point of the display device at RGB(max) measures $x_{D50}+\Delta x_{D50}$, $y_{D50}+\Delta y_{D50}$ rather than $x_{D50}$, $y_{D50}$. The variables $\Delta x_{D50}$ and $\Delta y_{D50}$ modify the theoretical D50 white point to account for visible differences. Thus, $x_{D50}+\Delta x_{D50}$, $y_{D50}+\Delta y_{D50}$ define the visual white point.

The $M_2$ correction modifies the XYZ values such that the saturated colors of the display device measure $x_{r2}+\Delta x_{r2}$, $y_{r2}+\Delta y_{r2}$; $x_{g2}+\Delta x_{g2}$, $y_{g2}+\Delta y_{g2}$; and $x_{b2}+\Delta x_{b2}$, $y_{b2}+\Delta y_{b2}$, rather then $x_{r2}$, $y_{r2}$; $x_{g2}$, $y_{g2}$; and $x_{b2}$, $y_{b2}$. The sets of variables $\Delta x_{r2}$, $\Delta y_{r2}$; $\Delta x_{g2}$, $\Delta y_{g2}$; and $\Delta x_{b2}$, $\Delta y_{b2}$ modify the theoretical RGB chromaticities to account for visible differences.

The white point correction matrix $M_1$ can be written as:

$$M_1(\Delta x_{D50}, \Delta y_{D50}) = M(x_{r_1}, y_{r_1}, x_{g_1}, y_{g_1}, x_{b_1}, y_{b_1}, x_{D50} + \Delta x_{D50}, y_{D50} + \Delta y_{D50}) M^{-1}(x_{r_1}, y_{r_1}, x_{g_1}, y_{g_1}, x_{b_1}, y_{b_1}, x_{D50}, y_{D50})$$

$$M_1(\Delta x_{D50}, \Delta y_{D50}) = M(x_{D50} + \Delta x_{D50}, y_{D50} + \Delta y_{D50}) M^{-1}(x_{D50}, y_{D50})$$

Although the matrix M is actually a function of RGB chromaticities and white point chromaticities, the notation has been simplified to indicate that the only parameters that are varying are the corrections to the white point. The RGB chromaticities can be considered constant when calculating the white point correction matrix $M_1$.

The matrix M defines the conversion from linear RGB space with a set of RGB phosphors to measured XYZ for a particular CRT display that is set to a measured white point of chromaticity x, y. The values of the $\Delta x_{D50}$ and $\Delta y_{D50}$ indicate the visual correction required to the chromaticity of D50 necessary to match the display device to a neutral white reflector illuminated in a viewing station with D50 illuminant.

To define M as a function of just chromaticities the expression begins as a description of matrix M in terms of the measured tristimulus values X, Y, and Z for R, G, and B. The values of XYZ relate to chromaticity values x, y according to the equations:

$$X = xY/y$$

$$Z = zY/y = (1-x-y)Y/y$$

Thus, $$\begin{pmatrix} X \\ Y \\ Z \end{pmatrix} = M \begin{pmatrix} R \\ G \\ B \end{pmatrix}$$

$$M = \begin{pmatrix} X_r & X_g & X_b \\ Y_r & Y_g & Y_b \\ Z_r & Z_g & Z_b \end{pmatrix}$$

$$M(x_{r_1}, y_{r_1}, z_{r_1}, Y_{r_1}, x_{g_1}, y_{g_1}, z_{g_1}, Y_{g_1}, x_{b_1}, y_{b_1}, z_{b_1}, Y_{b_1}) = \begin{pmatrix} (x_{r_1}/y_{r_1})Y_{r_1} & (x_{g_1}/y_{g_1})Y_{g_1} & (x_{b_1}/y_{b_1})Y_{b_1} \\ (y_{r_1}/y_{r_1})Y_{r_1} & (y_{g_1}/y_{g_1})Y_{g_1} & (y_{b_1}/y_{b_1})Y_{b_1} \\ (z_{r_1}/y_{r_1})Y_{r_1} & (z_{g_1}/y_{g_1})Y_{g_1} & (z_{b_1}/y_{b_1})Y_{b_1} \end{pmatrix}$$

$$M(x_{r_1}, y_{r_1}, z_{r_1}, Y_{r_1}, x_{g_1}, y_{g_1}, z_{g_1}, Y_{g_1}, x_{b_1}, y_{b_1}, z_{b_1}, Y_{b_1}) = M_c(x_{r_1}, y_{r_1}, z_{r_1}, x_{g_1}, y_{g_1}, z_{g_1}, x_{b_1}, y_{b_1}, z_{b_1}) \begin{pmatrix} Y_{r_1} & 0 & 0 \\ 0 & Y_{g_1} & 0 \\ 0 & 0 & Y_{b_1} \end{pmatrix}$$

where $M_c$ is a chromaticity matrix given by:

$$M_c(x_{r_1}, y_{r_1}, z_{r_1}, x_{g_1}, y_{g_1}, z_{g_1}, x_{b_1}, y_{b_1}, z_{b_1}) = \begin{pmatrix} x_{r_1}/y_{r_1} & x_{g_1}/y_g & x_b/y_{b_1} \\ y_{r_1}/y_{r_1} & y_{g_1}/y_{g_1} & y_{b_1}/y_{b_1} \\ z_{r_1}/y_{r_1} & z_{r_1}/y_{g_1} & z_{b_1}/y_{b_1} \end{pmatrix}$$

The chromaticity matrix $M_c$ can be further reduced to a function of just the x, y chromaticities for R, G, and B as follows:

$$M_c(x_{r_1}, y_{r_1}, x_{g_1}, y_{g_1}, x_{b_1}, y_{b_1}) = \begin{pmatrix} x_{r_1}/y_{r_1} & x_{g_1}/y_{g_1} & x_{b_1}/y_{b_1} \\ 1 & 1 & 1 \\ (1-x_{r_1}-y_{r_1})/y_{r_1} & (1-x_{g_1}-y_{g_1})/y_{g_1} & (1-x_{b_1}-y_{b_1})/y_{b_1} \end{pmatrix}$$

If the RGB chromaticities are fixed, the chromaticity matrix $M_c$ is a fixed matrix.

In order to obtain the matrix M as a function of the chromaticity matrix $M_c$ and the white point chromaticities, the equations can be solved as follows:

$$\begin{pmatrix} X_{wp} \\ Y_{wp} \\ Z_{wp} \end{pmatrix} = M \begin{pmatrix} R=1 \\ G=1 \\ B=1 \end{pmatrix}$$

$$\begin{pmatrix} X_{wp} \\ Y_{wp} \\ Z_{wp} \end{pmatrix} = M_c \begin{pmatrix} Y_{r_1} & 0 & 0 \\ 0 & Y_{g_1} & 0 \\ 0 & 0 & Y_{b_1} \end{pmatrix} \begin{pmatrix} R=1 \\ G=1 \\ B=1 \end{pmatrix}$$

$$\begin{pmatrix} X_{wp} \\ Y_{wp} \\ Z_{wp} \end{pmatrix} = M_c \begin{pmatrix} Y_{r_1} \\ Y_{g_1} \\ Y_{b_1} \end{pmatrix}$$

$$\begin{pmatrix} Y_{r_1} \\ Y_{g_1} \\ Y_{b_1} \end{pmatrix} = M_c^{-1} \begin{pmatrix} X_{wp} \\ Y_{wp} \\ Z_{wp} \end{pmatrix}$$

This equation can be expressed as a function of white point chromaticities:

$$\begin{pmatrix} Y_{r_1}(x_{wp}, y_{wp}) \\ Y_{g_1}(x_{wp}, y_{wp}) \\ Y_{b_1}(x_{wp}, y_{wp}) \end{pmatrix} = M_c^{-1} \begin{pmatrix} x_{wp}/y_{wp} \\ 1 \\ (1-x_{wp}-y_{wp})/y_{wp} \end{pmatrix}$$

Thus the resulting equation for M is a function of RGB and white point chromaticities only. By assuming that the RGB chromaticities are fixed, this becomes a function of white point only:

$$M(x_{r_1}, y_{r_1}, x_{g_1}, y_{g_1}, x_{b_1}, y_{b_1}, x_{wp}, y_{wp}) = M_c(x_{r_1}, y_{r_1}, x_{g_1}, y_{g_1}, x_{b_1}, y_{b_1})$$

$$\begin{pmatrix} Y_{r_1}(x_{wp}, y_{wp}) & 0 & 0 \\ 0 & Y_{g_1}(x_{wp}, y_{wp}) & 0 \\ 0 & 0 & Y_{b_1}(x_{wp}, y_{wp}) \end{pmatrix}$$

Hence, the expression used to determine the white point correction matrix $M_1$ can be expressed as:

$$M(x_{wp}, y_{wp}) = M_c \begin{pmatrix} Y_{r_1}(x_{wp}, y_{wp}) & 0 & 0 \\ 0 & Y_{g_1}(x_{wp}, y_{wp}) & 0 \\ 0 & 0 & Y_{b_1}(x_{wp}, y_{wp}) \end{pmatrix}$$

The chromatic correction matrix $M_2$, i.e., the saturated color correction matrix or RGB chromaticity correction matrix can be determined in a manner similar to the way the white point correction matrix $M_1$ was determined above. However, to determine and reduce the expression of $M_2$, the white point chromaticities are assumed fixed and the RGB chromaticities are the variables.

The white point correction matrix $M_1$ can be applied to correct errors between a theoretical white point of a display device and the empirical white point, e.g., a visual white point. The chromatic correction matrix $M_2$ can be applied to correct the remaining errors in the saturated colors. In other words the $M_2$ matrix can correct errors between the theoretical values of saturated colors and empirically or visually measured values of the saturated colors. The $M_2$ matrix can be applied to adjust a physical monitor, or alternatively, can be applied to adjust a working space such as AdobeRGB or sRGB.

For instance, if the chromatic correction $M_2$ matrix will be applied to adjust a working space, it can be expressed as:

$$M_2(\Delta x_r, \Delta y_r, \Delta x_g, \Delta y_g, \Delta x_b, \Delta y_b) = M(x_{r_2} + \Delta x_{r_2}, y_{r_2} + \Delta y_{r_2}, x_{g_2} + \Delta x_{g_2}, y_{g_2} + \Delta y_{g_2}, x_{b_2} + \Delta x_{b_2}, y_{b_2} + \Delta y_{b_2}, x_{wp}, y_{wp}) \times M^{-1}(x_{r_2}, y_{r_2}, x_{g_2}, y_{g_2}, x_{b_2}, y_{b_2}, x_{wp}, y_{wp})$$

where $x_{wp}, y_{wp}$ are assumed to be $x_{D50}, y_{D50}$, and $x_{r2}, y_{r2}, x_{g2}, y_{g2}$, and $x_{b2}, y_{b2}$ are the chromaticities of the RGB working space.

The white point correction, the chromatic correction, or both, can be stored in a color profile. A color profile is a data structure that describes the color characteristics of a particular device. Color profiles typically include color information such as information describing how the device converts from device-independent coordinates to device-dependent coordinates. By storing either the correction variables or redefining the color profile to include transformations like those described above, the color profile can enhance and improve soft proofing systems. To achieve compatibility with existing systems and standards, a profile can include and yet hide the transformation data. For instance, an ICC profile including transformation data associated with rescaling of the RGB phosphors, for example, may still be characterized by a true D50 white point $x_{D50}$, $y_{D50}$ in the profile. In actuality however, the white point may in fact measure $x_{D50} + \Delta x_{D50}$, $y_{D50} + \Delta y_{D50}$ and XYZ values for RGB derived from the actual measured RGB chromaticities. When a system implements the profile, an accurate color match can be achieved.

From a somewhat broader perspective, the first method transformation may comprise a multi-step transformation of device-independent coordinates. While experimental results have shown that the bifurcated transformation technique outlined above yields good color matching results, the transformation process could be broken up even further. Moreover, the transformation could be implemented in device-independent color spaces other than an XYZ color space. Referring again to the XYZ example, however, a more general correction can be represented by the equation:

$$\begin{pmatrix} X_{Corr} \\ Y_{Corr} \\ Z_{Corr} \end{pmatrix} = M_{Corr} \begin{pmatrix} X \\ Y \\ Z \end{pmatrix}$$

$$= M_1(\Delta x_1, \Delta y_1) M_2(\Delta x_2, \Delta y_2) \ldots M_n(\Delta x_n, \Delta y_n) \begin{pmatrix} X \\ Y \\ Z \end{pmatrix}$$

The matrices $M_1$–$M_n$ may make the corrections to different chromaticities. By way of example, $M_1$ could correct white point chromaticity, $M_2$ could correct red chromaticity, $M_3$ could correct green chromaticity, $M_4$ could correct blue chromaticity, and so forth.

In general, each matrix in the collection of matrices $M_1$–$M_n$ can be described as follows. If you let $M_{Component\ Transform}$ ($M_{CT}$) represent any matrix in the set of matrices $\{M_1$–$M_n\}$, then $M_{CT} = (M_{Experimental})(M_{Theoretical})^{-1}$. The matrix $M_{Theoretical}$ defines the conversion from device-dependent space to device-independent space according to the theories of color science. The matrix $M_{Experimental}$ defines the conversion from device-dependent space to device-independent space according to experimental results such as visual comparison. If the theories of color science are empirically robust, then $M_{Theoretical}$ will be the same as $M_{Experimental}$, and $(M_{Experimental})(M_{Theoretical})^{-1}$ will yield an $M_{CT}$ that is an identity matrix. However, if the theories of color science break down and $M_{Theoretical}$ is not the same as $M_{Experimental}$, $M_{CT}$ will not be an identity matrix; but rather, $M_{CT}$ will be the transform matrix for yielding a color match for that respective chromaticity.

Figure 6:
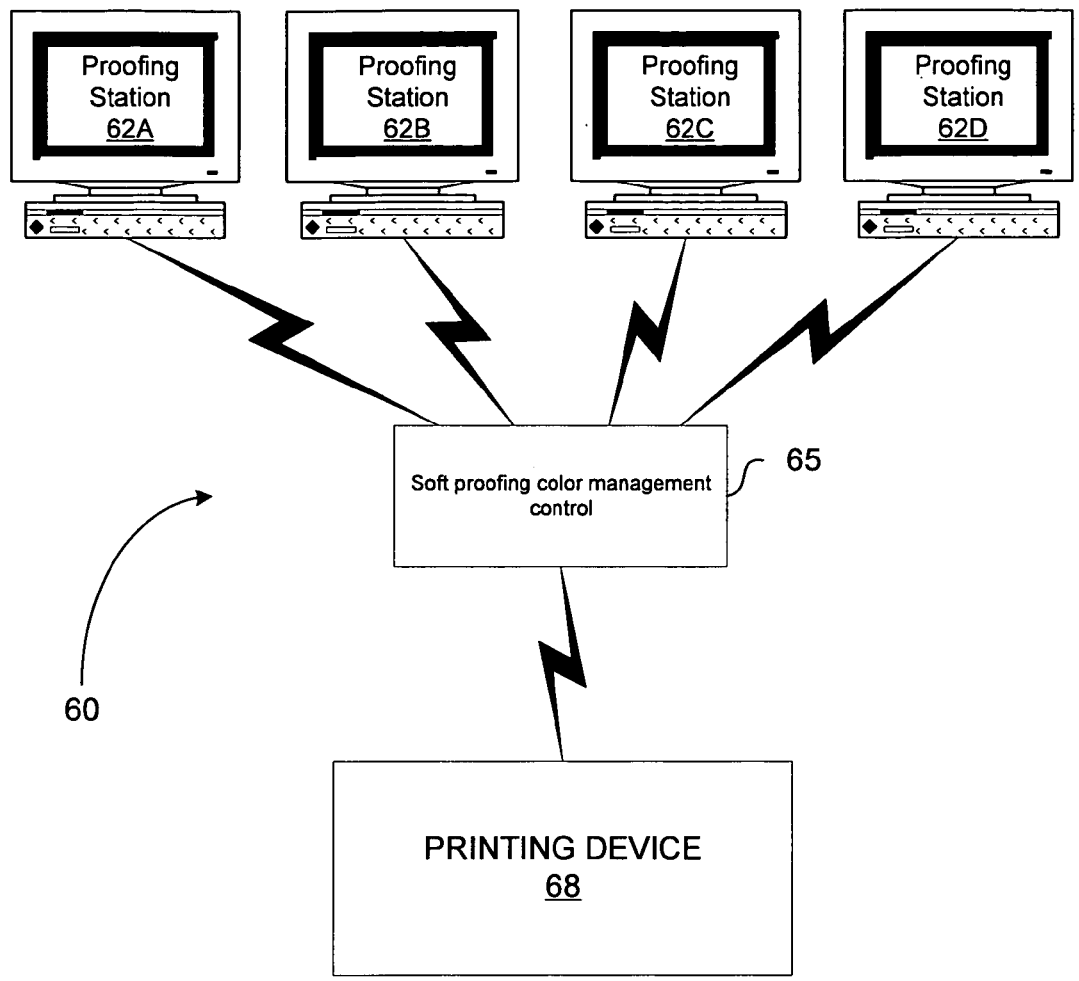
FIG. 6 illustrates an exemplary soft proofing system according to an embodiment of the invention.

FIG. 6 illustrates an exemplary soft proofing system according to an embodiment of the invention. A soft proofing system suitable for implementation of techniques for color transformation using the first method transformation described above and/or the second method transformation described below can include one or more proofing stations 62A–62D. Each proofing station 62A–62D, for example may include a processor, a user input device, a display monitor, memory, a storage device and a printer. The proofing stations may substantially conform to conventional computer systems used by graphic artists and other users in the creation of textual and graphic imagery for electronic display or print reproduction. A memory/bus controller and system bus couple processor and memory, while one or more I/O controllers and I/O bus couple the processor and memory to user input device, display monitor, storage device, and printer.

The processor may take the form of a general purpose microprocessor and can be integrated with or form part of a PC, Macintosh, computer workstation, hand-held data terminal, palm computer, digital paper, or the like. The user input device may include a conventional keyboard and pointing device such as a mouse, pen, or trackball, if desired. The monitor may include a CRT, flat panel display, or the like, that displays textual and/or graphic information to the user. The memory may include random access memory (RAM) storing program code that is accessed and executed by processor to carry out both the first and second method transformation techniques.

The program code can be loaded into the memory from a storage device, which may take the form of a fixed hard drive or removable media drive associated with the system. For example, the program code can be initially carried on computer-readable media such as magnetic, optical, magneto-optic, phase-change, or other disk or tape media. Alternatively, the program code may be loaded into memory from electronic computer-readable media such as EEPROM, or downloaded over a network connection. If downloaded, the program code may be initially embedded in a carrier wave or otherwise transmitted on an electromagnetic signal. The program code may be embodied as a feature in an application program providing a wide range of functionality.

Soft proofing system 60 may also include soft proofing color management control 65 coupled to the respective proofing stations 62A–62D. The soft proofing color management control 65, for example, may input image data to the respective proofing stations 62A–62D. The image data, for example may be transformed by color management control 65, before being sent to proofing stations 62A–62D. Alternatively, image data may be transformed by each respective proofing station 62A–62D after being sent from the color management control 65.

Soft proofing system 60 may also be associated with at least one printing device 68 such as a printing press. In operation, soft proofing system 60 may generate a color image at the respective proofing stations 62A–62D. Color specialists may inspect the image at respective proofing stations 62A–62D and the visual appearance of the image may be adjusted to their liking according to the first method transformation described above. In addition, the image may be further chromatically corrected using the second method transformation described below. Once the image looks acceptable at the proofing stations 62A–62D, printing device 68 may be used to mass print large quantities print media that look visually equivalent to the image displayed at the proofing stations 62A–62D. Importantly, implementing the techniques and teachings of the first method transformation described above and the second method transformation described below can help ensure that the images printed by printing device 68 will appear visually equivalent to the images that appear at the proofing stations 62A–62D.

An accurate soft proofing system can be realized based on the assumption that a simple matrix-based correction to XYZ will result in a good correlation between CRT displays and reflective hard copies. This correction can either be formulated as correcting hard copy XYZ values to the corresponding CRT XYZ values:

$$\begin{pmatrix} X_{CRT} \\ Y_{CRT} \\ Z_{CRT} \end{pmatrix} = M_{HC \rightarrow CRT} \begin{pmatrix} X_{HC} \\ Y_{HC} \\ Z_{HC} \end{pmatrix}$$

$$= M_1(\Delta x_{D50}, \Delta y_{D50}) M_2(\Delta x_r, \Delta y_r, \Delta x_g, \Delta y_g, \Delta x_b, \Delta y_b) \begin{pmatrix} X_{HC} \\ Y_{HC} \\ Z_{HC} \end{pmatrix}$$

or correcting CRT XYZ values to the corresponding hard copy XYZ values:

$$\begin{pmatrix} X_{HC} \\ Y_{HC} \\ Z_{HC} \end{pmatrix} = M_{HC \rightarrow CRT}^{-1} \begin{pmatrix} X_{HC} \\ Y_{HC} \\ Z_{HC} \end{pmatrix}$$

$$= M_2^{-1}(\Delta x_r, \Delta y_r, \Delta x_g, \Delta y_g, \Delta x_b, \Delta y_b)$$

$$M_1^{-1}(\Delta x_{D50}, \Delta y_{D50}) \begin{pmatrix} X_{CRT} \\ Y_{CRT} \\ Z_{CRT} \end{pmatrix}$$

The examples below illustrate ways in which this first method transformation can be used.

EXAMPLE 1

The matrix $M_{HC \rightarrow CRT}^{-1}$ can be applied automatically in the driver software or EPROM of the device that measures XYZ (or equivalent) measurement data. Thus, all analog and digital settings of the CRT (most notably the white point or color temperature setting) will automatically correlate well to the illuminant chosen for viewing reflective images. Furthermore, all measured XYZ data will be automatically corrected. If the measurement device is used to set a D50 white point on the CRT, then an ICC profile can be generated in the standard manner. A good visual match between CRT and hard copy will occur.

Some color measurement tools such as Kodak Color-Flow™ and Gretag-Macbeth ProfileMaker™ measure 100% R, G, B, and a series of gray colors ranging from black to white. In addition, other ICC tools may measure extra combinations of RGB color values. The most common result is a simple matrix/TRC profile based directly on the XYZ measured data. In the case where the CRT is not set to a D50 white point, a chromatic adoption can be applied to the data in order to adjust it to D50.

These measurement tools, however, are hampered by the fact that the XYZ data of the CRT is not visually consistent with the XYZ data measured for other media. Thus, to achieve a good visual match between devices and media, the $M_{HC \rightarrow CRT}^{-1}$ matrix can be applied automatically to the CRT XYZ data. This conversion can be applied for all situations involving measurement, including specifications of CRT's and control of CRTs, relative to the hard copy.

Suppliers of operating systems and/or CRT hardware can implement the current invention to achieve good visual matches between their CRTs and various printers. For instance, a good visual match can be achieved by first correcting all XYZ data used to define the automatic CRT setup conditions (such as white point or color temperature) using the $M_{HC \rightarrow CRT}^{-1}$ matrix. Second, using the $M_{HC \rightarrow CRT}^{-1}$ matrix, all XYZ data used to generate the ICC profiles can be corrected automatically to characterize the CRT for a particular setup condition.

In other words, the current invention can be used to redefine of the CIE specification for color with respect to CRTs. Moreover, this redefinition can be used for any color metric, including specifically soft proofing applications.

EXAMPLE 2

The matrix $M_{HC->CRT}$ can be applied to the XYZ values of the illuminant for hard copy (e.g. D50) in order to derive the corresponding CRT white point values in XYZ for the CRT:

$$\begin{pmatrix} X_{CRT} \\ Y_{CRT} \\ Z_{CRT} \end{pmatrix} = M_{HC->CRT} \begin{pmatrix} X_{HC} \\ Y_{HC} \\ Z_{HC} \end{pmatrix}$$

$$= M_{HC->CRT} \begin{pmatrix} X_{D50} \\ Y_{D50} \\ Z_{D50} \end{pmatrix}$$

$$= M_{HC->CRT} \begin{pmatrix} 0.9642 \\ 1.000 \\ 0.8249 \end{pmatrix}$$

The uncorrected ICC profile for the CRT can be constructed from the combination of chromaticity and white point values for the CRT.

$$M(x_{r_1}, y_{r_1}, x_{g_1}, y_{g_1}, x_{b_1}, y_{b_1}, x_{wp}, y_{wp}) = M_c(x_{r_1}, y_{r_1}, x_{g_1}, y_{g_1}, x_{b_1}, y_{b_1})$$

$$\begin{pmatrix} Y_{r_1}(x_{wp}, y_{wp}) & 0 & 0 \\ 0 & Y_{g_1}(x_{wp}, y_{wp}) & 0 \\ 0 & 0 & Y_{b_1}(x_{wp}, y_{wp}) \end{pmatrix}$$

The corrected matrix can then be calculated by simply applying the transform to convert from CRT XYZ to hard copy XYZ and then re-computing the chromaticity values in the expression above. Alternatively, the correction can be separated into a white point correction and chromatic correction.

If the CRT has been set physically to a corrected visual white point (e.g. $M_{HC->CRT}(XYZ_{D50})$), then by definition the corrected values of CRT white point chromaticities $x_{wp}, y_{wp}$ going from CRT to hard copy will be $x_{D50}, y_{D50}$. This is because the corrected values of XYZ (going from CRT back to HC) will be D50 for the CRT white:

$$\begin{pmatrix} X_{D50} \\ Y_{D50} \\ Z_{D50} \end{pmatrix} = M_{HC->CRT}^{-1} M_{HC->CRT} \begin{pmatrix} X_{D50} \\ Y_{D50} \\ Z_{D50} \end{pmatrix}$$

$$= M_{HC->CRT}^{-1} \begin{pmatrix} X_{WPCRT} \\ Y_{WPCRT} \\ Z_{WPCRT} \end{pmatrix}$$

Thus the CRT matrix that is corrected for CRT to hard copy will automatically have the value of desired white point chromaticities, i.e., the same white point as that of the hard copy illuminant such as D50. This is equivalent to applying the white point correction matrix $M_1^{-1}$ to the CRT XYZ data upon which the CRT profile is based.

The remaining chromatic correction can simply be performed by applying the chromatic correction matrix $M_2^{-1}$ to the CRT matrix constructed above using the uncorrected chromaticities for RGB and the corrected white point chromaticity values (e.g., D50). The advantage of this approach is that standard ICC generating tools can be employed to construct an uncorrected ICC profile for a CRT in which the desired white point (e.g., D50) has been assumed. The resulting profile can be corrected in a simple manner by applying the chromatic correction matrix $M_2^{-1}$ to the matrix portion of the matrix/TRC profile. This simple correction, combined with setting the white point of the CRT to a visually accurate D50 white point, will result in a good visual match between the CRT and hard copy.

EXAMPLE 3

The matrix $M_{HC->CRT}$ is applied to the XYZ values for hard copy in order to derive the corresponding values in XYZ for the CRT.

$$\begin{pmatrix} X_{CRT} \\ Y_{CRT} \\ Z_{CRT} \end{pmatrix} = M_{HC->CRT} \begin{pmatrix} X_{HC} \\ Y_{HC} \\ Z_{HC} \end{pmatrix}$$

Recall that the matrix for a CRT can be constructed from the combination of chromaticity and white point values for the CRT.

$$M(x_{r_1}, y_{r_1}, x_{g_1}, y_{g_1}, x_{b_1}, y_{b_1}, x_{wp}, y_{wp}) = M_c(x_{r_1}, y_{r_1}, x_{g_1}, y_{g_1}, x_{b_1}, y_{b_1})$$

$$\begin{pmatrix} Y_{r_1}(x_{wp}, y_{wp}) & 0 & 0 \\ 0 & Y_{g_1}(x_{wp}, y_{wp}) & 0 \\ 0 & 0 & Y_{b_1}(x_{wp}, y_{wp}) \end{pmatrix}$$

Assuming that the above values for this matrix are constant, then a new matrix can be defined based on the constants and corrections to the constants.

$$M(\Delta x_{r_1}, \Delta y_{r_1}, \Delta x_{g_1}, \Delta y_{g_1}, \Delta x_{b_1}, \Delta y_{b_1}, \Delta x_{wp}, \Delta y_{wp}) = M(x_{r_1} + \Delta x_{r_1}, y_{r_1} + \Delta y_{r_1}, x_{g_1} + \Delta x_{g_1}, y_{g_1} + \Delta y_{g_1}, x_{b_1} + \Delta x_{b_1}, y_{b_1} + \Delta y_{b_1}, x_{wp} + \Delta x_{wp}, y_{wp} + \Delta y_{wp})$$

The $M_{HC->CRT}$ matrix can then be created based on visual correction techniques.

$$M_{HC->CRT} = M(\Delta x_{r_1}, \Delta y_{r_1}, \Delta x_{g_1}, \Delta y_{g_1}, \Delta x_{b_1}, \Delta y_{b_1}, \Delta x_{wp}, \Delta y_{wp}) M^{-1}(0,0,0,0,0,0,0,0)$$

This final expression defines a single matrix that is a function of visual corrections to white point and the chromaticities. This single matrix can be used to correlate XYZ values of hard copy to XYZ values for a CRT.

Second Method Transformation

Thus far, first method transformation techniques have been described for achieving a visual match between CMYK hard copy images (viewed in a controlled viewing environment such as a D50 light booth) and corresponding images rendered to a CRT or LCD display in the form of RGB pixel data. The first method transformation described above with respect to FIGS. 1–5 performed an XYZ->X'Y'Z' conversion by the use of a single matrix in order to minimize errors in the XYZ observer functions which are currently used as the standard calculation for deriving device-independent data, i.e., data that defines a unique color regardless of whether the color is rendered and viewed via hard copy output or via emissive display.

While the first method transformation described above eliminates many of the perceived color errors between hard copy images and displays, perceivable errors may still remain. Therefore, a second additional method of further refining the color transformation will now be described. This second method transformation can be used either alone or in combination with the first method transformation described above to reduce even further these discrepancies without destroying the overall accurate appearance of hard copy images that are simulated on the display device.

In general, while the first method transformation described above was independent of the device coordinates on which the color is displayed, the second method transformation uses the device-independent XYZ color coordinates as well as a device-dependent display profile (RGB, for example) associated with each XYZ color to produce a corrected output X"Y"Z". The chromatically corrected device-independent coordinate data that results from the second method transformation can then be stored in the appropriate look up table locations of the device-dependent display profile, or loaded into an XYZ->X"Y"Z" abstract profile.

The second method transformation preserves the existing accurate gray balance and ensures that all adjustments vary linearly with linear RGB space in a fashion similar to the correction matrix for converting XYZ->X'Y'Z' via the first method transformation.

Figure 7A:
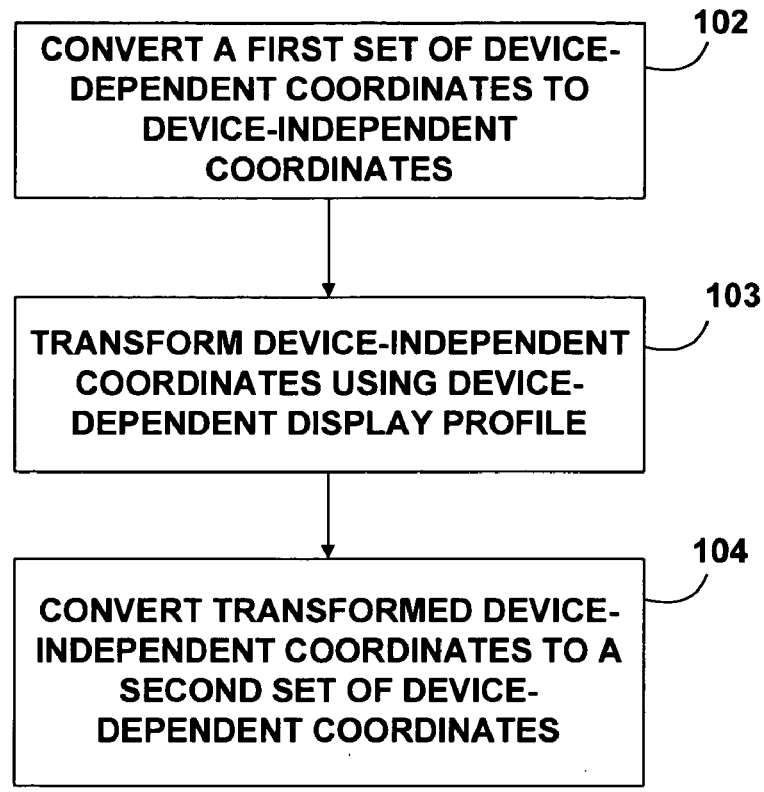
FIGS. 7–13 are flow diagrams according to embodiments of the invention.

The second method transformation may be used to chromatically correct the colors of an output device, i.e., a display, for example, so that the image produced on the output device looks visually equivalent to the output of an imaging device, e.g., a printer. For example, FIG. 7A is a flow diagram illustrating a color transformation process according to another embodiment including the second method transformation. As shown in FIG. 7A, a first set of device-dependent coordinates are converted to device-independent coordinates (102). The device-independent coordinates are then transformed using a device-dependent display profile of the output device (103). These transformed device-independent coordinates are then converted to a second set of device-dependent coordinates (104). The process of FIG. 7A can be performed on all of the pixels in a color image so that the output of a second imaging device, e.g., a display, looks visually equivalent to the output of a first imaging device, e.g., a printer.

Figure 7B:
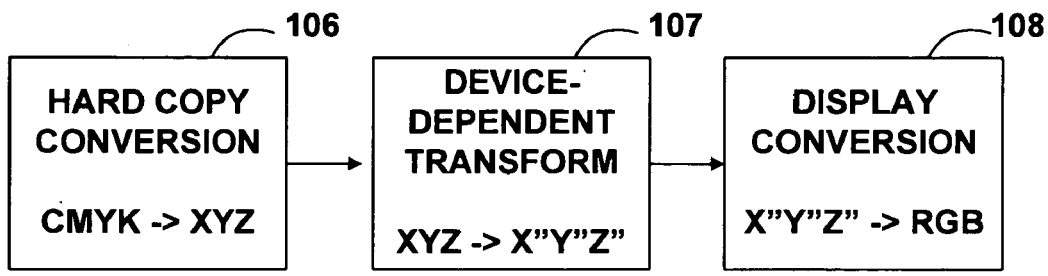

FIG. 7B is a flow diagram illustrating one implementation of the process of FIG. 7A. As shown, the image data of a hard copy device-dependent CMYK image is converted from CMYK coordinates to device-independent XYZ coordinates (106). The XYZ coordinates are transformed using the device-dependent display profile to produce X"Y"Z" (107). The X"Y"Z" coordinates are then converted to RGB coordinates (108) for presentation on a display device. In this manner, the output of a display device using the RGB coordinates can be made to be visually equivalent to a hard copy printed with the CMYK coordinates.

Figure 8A:
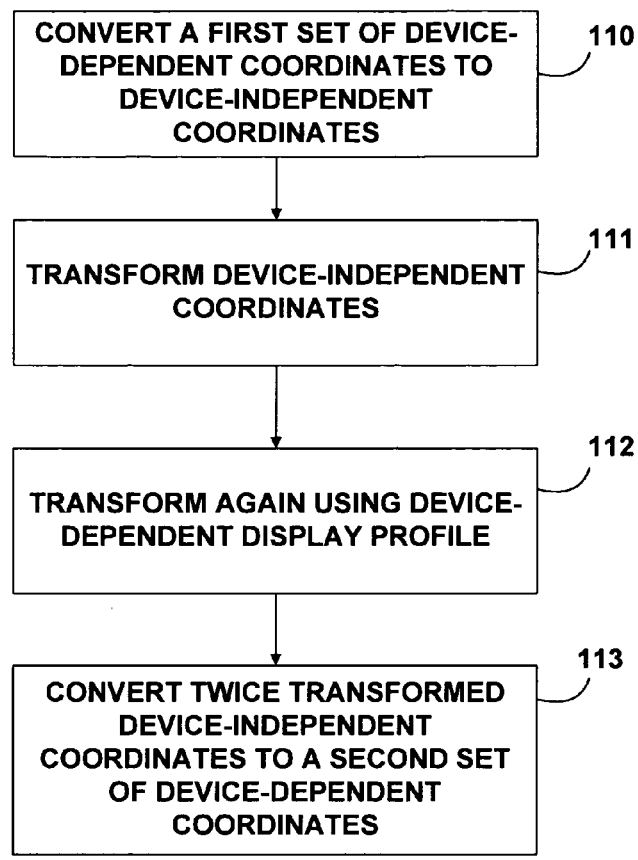

The second method transformation may also be used in combination with the first method transformation described above. For example, FIG. 8A is a flow diagram illustrating a color transformation process according to another embodiment of the invention including both the first method transformation and the second method transformation. As shown in FIG. 8A, a first set of device-dependent coordinates are converted to device-independent coordinates (110). The device-independent coordinates are then transformed via the first method transformation (111). Up to this point, FIG. 8A is identical to the method shown and described above with respect to FIG. 1. However, the next step in the method of FIG. 8A is to transform the device-independent coordinates again using a device-dependent display profile according to the second method transformation (112). These twice transformed coordinates are then converted to a second set of device-dependent coordinates (113). Again, the process of FIG. 8A can be performed on all of the pixels in a color image so that the output of a second imaging device, e.g., a display, looks visually equivalent to the output of a first imaging device, e.g., a printer.

Figure 8B:
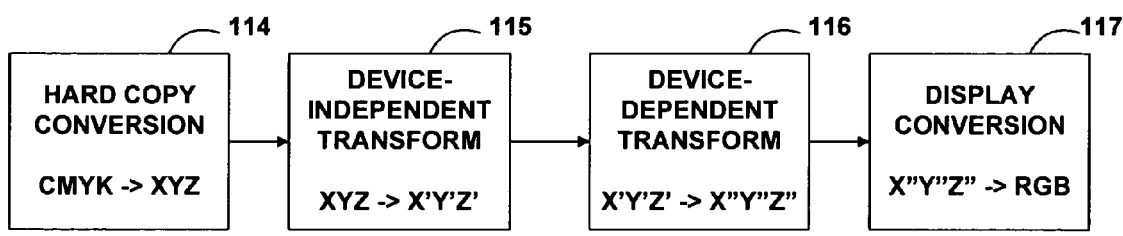

FIG. 8B is a flow diagram illustrating one implementation of the process of FIG. 8A. As shown, the image data of a hard copy device-dependent CMYK image is converted from CMYK coordinates to device-independent XYZ coordinates (114). The XYZ coordinates are then transformed to X'Y'Z' (115). Next, the X'Y'Z' coordinates are transformed using the device-dependent display profile to produce X"Y"Z" (116). The X"Y"Z" coordinates are then converted to RGB coordinates (117) for presentation on a display device. In this manner, the output of a display device using the RGB coordinates can be made to be visually equivalent to a hard copy printed with the CMYK coordinates.

Figure 9:
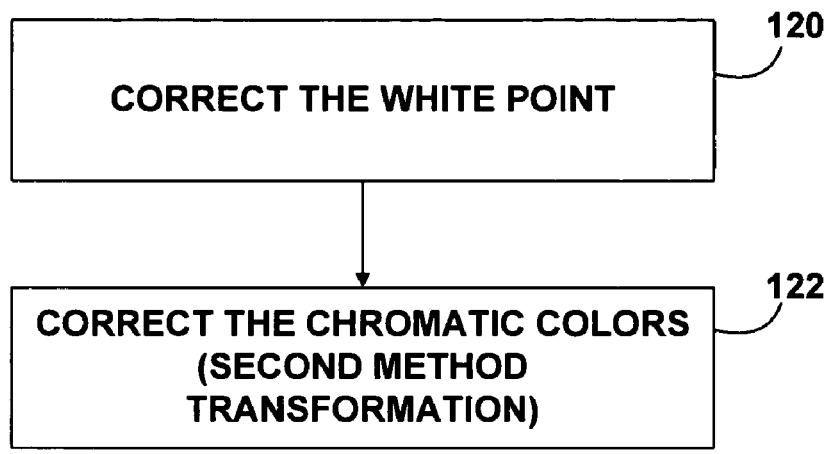

FIG. 9 is a flow diagram of a general process that can be implemented to transform device-independent coordinates using only the white point correction of the first method transformation and using only the second method transformation to chromatically correct the colors. As shown, a white point is corrected (120) and then chromatic colors are corrected using the second method transformation described below with respect to FIGS. 11–15 (122).

Figure 10:
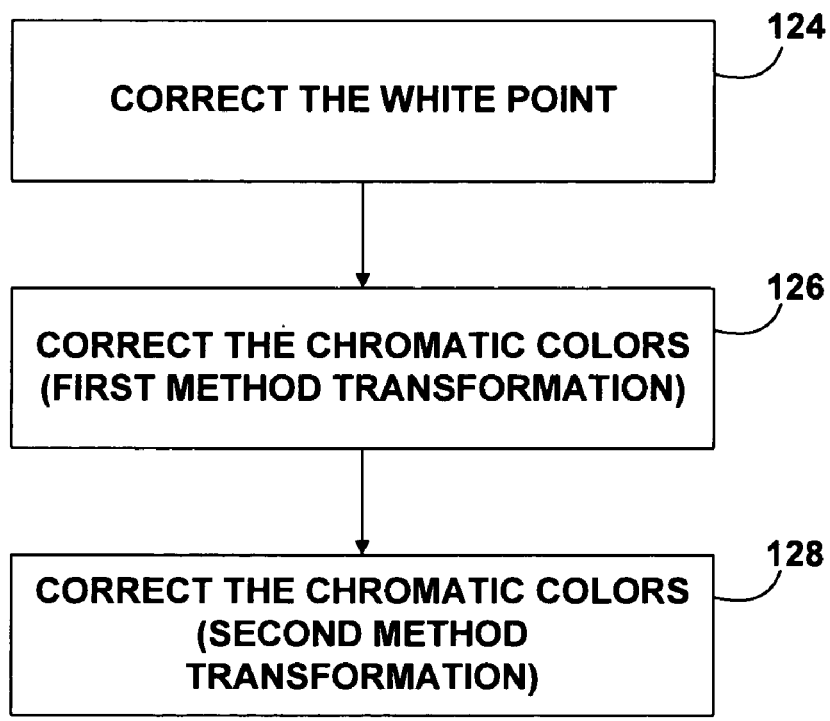

FIG. 10 is a flow diagram of another general process that can be implemented to transform device-independent coordinates using both the first method transformation and the second method transformation described herein. As shown, a white point is corrected (124) and then chromatic colors are corrected using the first method transformation described above with respect to FIGS. 1–5 (126). The chromatic colors then undergo a second correction using the second method transformation described below with respect to FIGS. 11–15 (128).

The white point correction (120, 126) for FIGS. 9 and 10 may be achieved using the methods described above with respect to FIGS. 3 and 4. Similarly, the first chromatic colors correction (122) may be achieved using the first method transformation described above with respect to FIG. 3 and FIG. 5.

Referring again to FIG. 8, the second method transformation (112) may, under certain circumstances, obtain more accurate color matching than is possible using the first method transformation (111) alone. When used in combination with the first method transformation (111), second method transformation (112) provides for finer-grain adjustment of device-independent coordinates to ensure that the color output on a display device, for example, looks substantially the same as the color as printed on a printer.

To achieve this, the second method transformation transforms the device-independent coordinates using a device-dependent display profile associated with the particular output device. For example, if the output device is a CRT display, the RGB display profile associated with that device is used to transform the device-independent coordinates. As discussed above with respect to the first method transformation (FIG. 5) the second method transformation may be "theoretically" unnecessary due to the widely-accepted CIE color equations. However, the general breakdown in color science discussed above mandates the use of either one or both of the first and second method transformations, especially in the field of soft proofing where accurate color matching is desired and there is a significant difference in spectral properties between the media, i.e., the display and the hard copy viewed with a D50 light source. Thus, the second method transformation, either alone or in combination with the first method transformation described above, compensates for color matching deficiencies that arise in the conventional XYZ transformations in the context of hard copy to soft copy matching.

The second method transformation for correcting the chromatic colors (122, 128) will now be described. Again, this second method transformation may be used with or without the first method transformation being performed on the chromatic colors. If used with the first method on the chromatic colors, the second method comprises a second-order correction to the chromatic colors. However, if used as a correction to the chromatic colors after the first method is simply used to adjust the white point, the second method comprises a first-order correction to the chromatic colors. As discussed in greater detail below, parameters of the technique may be selected depending on whether the technique is used as a first order correction or second order correction on the chromatic colors.

In general, the second method transformation is a transformation of device-independent coordinates using a device-dependent display profile associated with the particular output device. In the embodiment shown in FIG. 9, the second method transformation correction to the chromatic colors (122) would take as inputs the transformed device-independent coordinates XYZ converted from the hardcopy CMYK coordinates, for example, and output transformed device-independent coordinates X"Y"Z" using a device-dependent display profile. If the output device is a CRT display, for example, the RGB display profile for that device would be used. For the embodiment shown in FIG. 10, the second method transformation correction to the chromatic colors (128) would take as inputs the transformed device-independent coordinates X'Y'Z' from the first method transformation (126) and output twice transformed device-independent coordinates X"Y"Z" using a device-dependent display profile.

The second method transformation, like the first method transformation, preferably operates on a device-independent coordinate system that scales linearly with the intensity of light that is stimulating the retina of the observer. Examples of device independent coordinate systems that scale linearly with light intensity include tristimulus space (XYZ), chromaticity space (Yxy) or other coordinate systems such as u'v'. For simplicity, this general category of corrections will be referred to as "chromaticity corrections". These systems are not very uniform visually and are very different from systems that are considered "color appearance models or CAMs" such as CIELAB and CIECAM97s. These latter systems typically apply highly non-linear shaping to values of XYZ (or linear transforms of XYZ) that are normalized to a white reference such as D50 light. For example, the CIELAB color space applies cube-root functions to the value of luminosity (Y) and calculates the differences between cube root functions of X, Y, and Z.

In this invention, the chromaticity corrections are performed piecewise. That is, each region of color in the visually non-uniform color space has a corresponding group of chromaticity corrections that are applied only within the boundaries of that region of color to obtain the corrected color coordinates. For example, each primary color, such as red, green, and blue, has an associated group of primary chromaticity corrections specific to that primary region of color. In addition, each secondary color, such as cyan, magenta and yellow, has an associated group of secondary chromaticity corrections specific to that secondary region of color.

Each group of chromaticity corrections is applied only within the boundaries that define the corresponding region of color for that group. In this sense, the chromaticity corrections are applied piecewise in the color space to achieve the more accurate color matching result. Thus, if color match for one particular region of color is acceptable, the chromaticity corrections in that region of color could be zero. The second method transformation is therefore flexible in the sense that it allows selectivity in the amount of chromaticity correction applied in each region of color.

The groups of chromaticity corrections can include several different variable adjustments to the chromatic colors. One type of chromaticity correction which may be applied are "correction levels". The correction levels are applied piecewise within the non-visually uniform color space. That is, each region of color in the non-visually uniform color space has a set of corresponding correction levels that are applied only within the boundaries of that region of color. The set of correction levels for each region of color correspond to the amount of correction to the hue, saturation and brightness in that region of color required to achieve the desired match between a hard-copy images and the resulting display output. The correction levels can be determined using an iterative optimization process like the one described above with respect to the first method transformation and FIGS. 4 and 5. A more detailed description of how the correction levels are determined is given below.

Another type of chromaticity correction that may be applied to obtain the corrected color coordinates is a "correction factor". The correction factor is defined as a piecewise linear correction function within each region of color. That is, each region of color in the non-visually uniform color space has a corresponding correction factor that is applied only within the boundaries of that region of color. The correction factor for each region of color is based on linear device-dependent coordinates associated with the particular device on which the image is to be displayed. For example, if the device is a CRT display, the correction factors to be applied to the linear device-independent coordinates (i.e., visually non-uniform coordinates) in each region of color would be based on a piecewise linear correction function of the linear device-dependent coordinates $R_L G_L B_L$. A more detailed description of how the correction factors are determined is given below.

Figure 11:
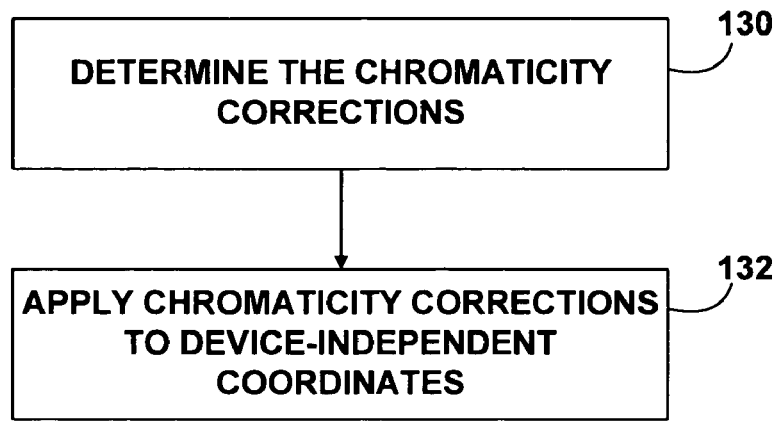

FIG. 11 is a flow diagram illustrating the second method transformation. To perform the second method transformation, the chromaticity corrections are first determined (130). The chromaticity corrections are then applied to the device-independent coordinates to arrive at the corrected values of X"Y"Z" (132).

Figure 12:
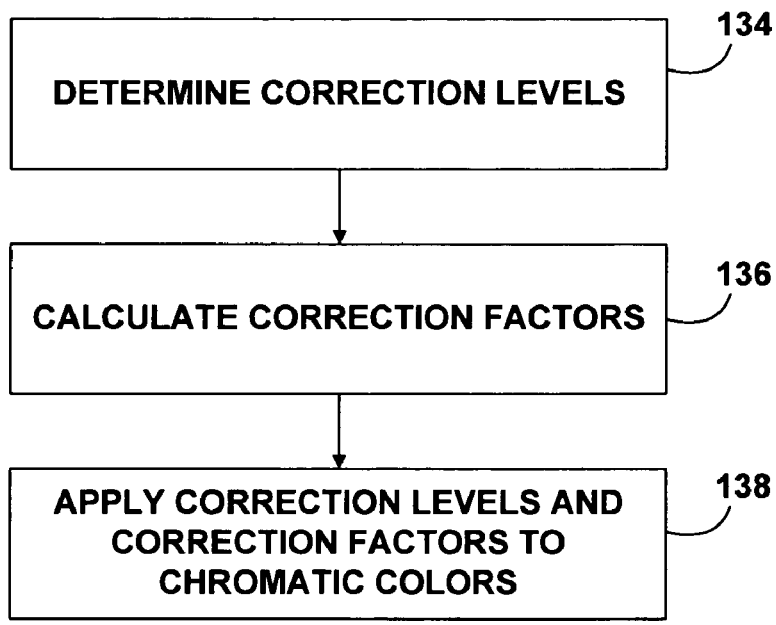

FIG. 12 shows another flow diagram illustrating the second method transformation. First, the correction levels necessary to improve the accuracy of the chromatic correction are determined (134). The correction levels can be determined using an iterative optimization process like the one described above with respect to the first method transformation and FIGS. 4 and 5. For example, if the second method transformation is being performed after the first method transformation 6 (see FIG. 9), the delta E error remaining after the first method transformation may be on the order of 5–10 delta E. In that case, the correction levels may be determined such that the error remaining after the second method transformation may be on the order of 1–2 delta E to even further reduce any perceived differences between the hard copy image and the displayed image. If the second method transformation is being performed alone, after correction of the white point (see FIG. 10), the correction levels may be on the order of 3–5 delta E.

If the second method transformation alone is being used to correct the chromatic colors, the method shown in FIG. 4 is first used to correct the white point. Then, a method similar to that shown in FIG. 5 is used to determine the correction level for each of the display colors, which could include red, blue, green, cyan, magenta and yellow for a CRT display device, for example.

If the second method transformation is being used in combination with the first method transformation (FIGS. 8A and 8B), the correction level is determined as discussed above using a method similar to that shown in FIG. 5. In this case, however, particular attention is focused on those classes of images which were not adequately visually matched after the first method transformation. Through this iterative process, the desired correction levels required to achieve a good visual match between the displayed image and the printed image are determined.

Next, correction factors for the chromatic colors of the display device are calculated using the device-dependent display profile (136). The correction factors permit selective adjustment of the additive primary colors (such as R, G, and B) as well as the secondary colors (such as C, M, and Y) that make up the chromatic colors for a display device. The correction levels and the correction factors are then applied to the chromatic colors of the display device to produce the chromatically corrected colors (138).

Figure 13:
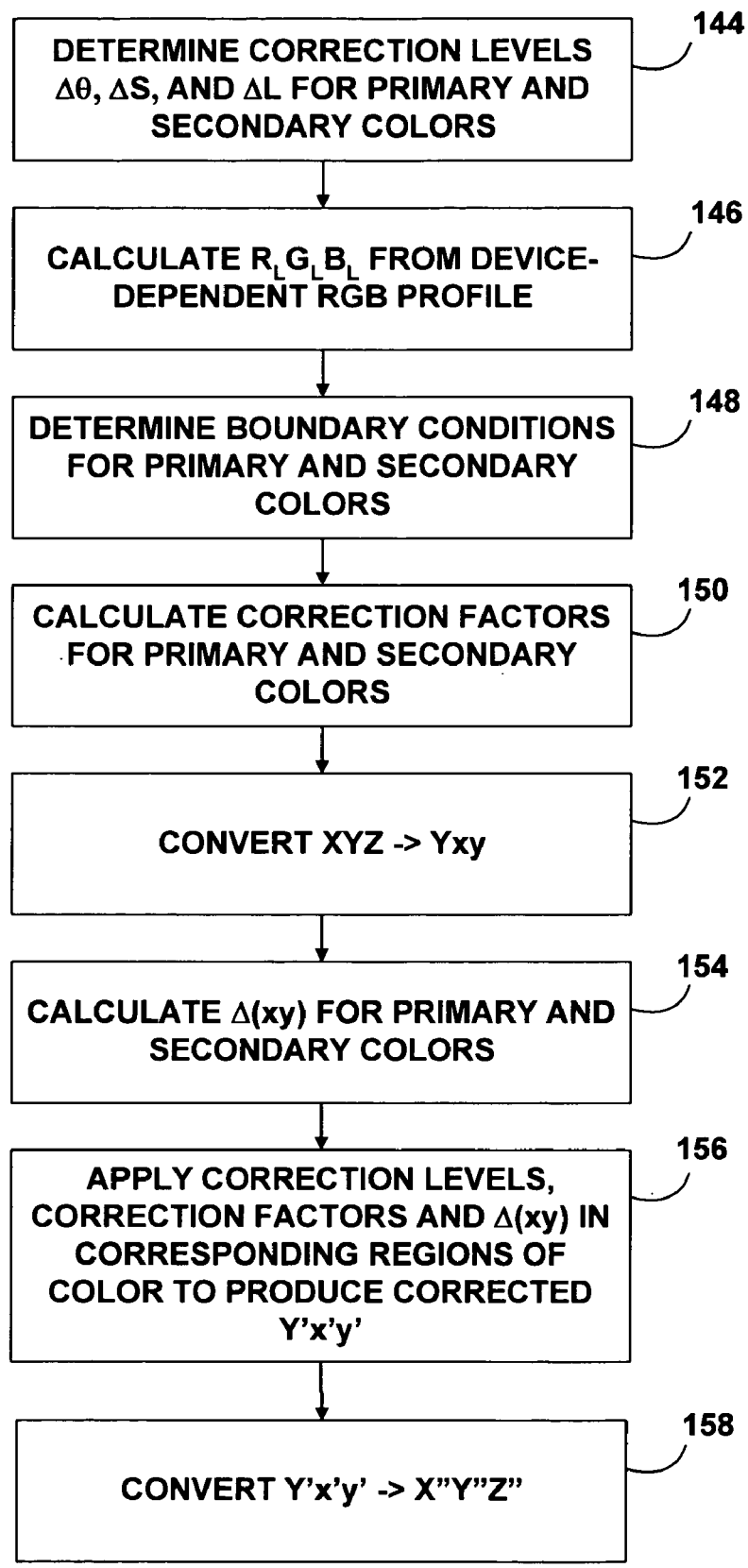

FIG. 13 shows a more detailed flow diagram of the second method transformation. First, the correction levels necessary to improve the accuracy of the chromatic correction are determined (144). The correction levels permit localized adjustment to the hue ($\Delta\theta$), saturation ($\Delta S$) and brightness/luminosity ($\Delta L$) of localized regions of color. Thus, a set of three correction levels $\Delta\theta$, $\Delta S$ and $\Delta L$ are determined for each of the primary colors red, green, blue and for each of the secondary colors cyan, magenta, yellow that make up the chromatic colors for the display device. Each set of correction levels is applied "piecewise", that is, only within the corresponding region of color.

Figure 14:
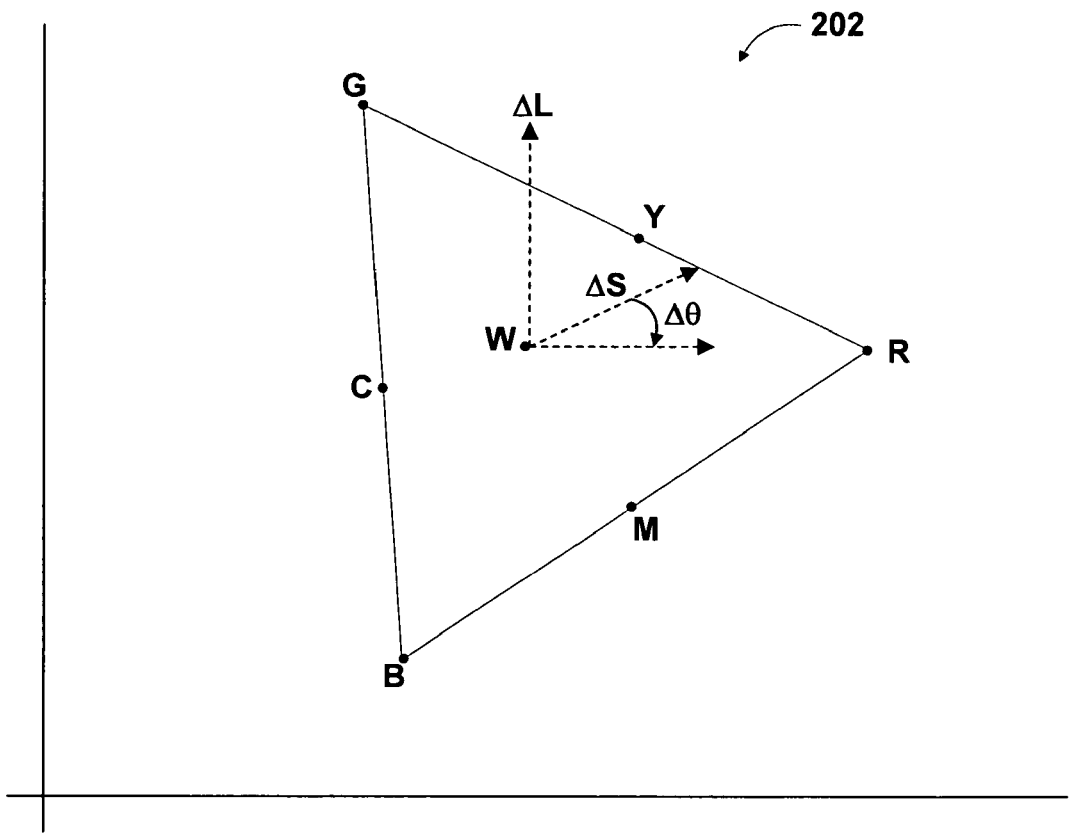
FIGS. 14 and 15 are representative illustrations of an RGB color space.

Referring now to FIG. 14, the three correction levels $\Delta\theta$, $\Delta S$ and $\Delta L$ in an example Yxy RGB color space 202 are shown. $\Delta\theta$ refers to the change in hue moving in an angular direction from one point in the color space to another point in the color space. $\Delta S$ refers to change in saturation with varying distance from the white point (W), with less saturated colors lying near the white point and with colors becoming more saturated as distance from the white point increases. $\Delta L$ refers to the change in brightness or luminosity moving in the Y direction (out of the plane of the paper).

Referring again to FIG. 13, the set of three correction levels $\Delta\theta$, $\Delta S$ and $\Delta L$ can be determined (144) in various ways either in rectangular, polar, or cylindrical coordinates. In the embodiment illustrated and described herein cylindrical coordinates are used. However, it shall be understood that the invention is not limited to any particular coordinate system and similar results may be obtained using any coordinate system known in the art of color science. Again, the three potential adjustments include $\Delta\theta$ (angular corrections in x,y), $\Delta S$ (saturation corrections in x,y coordinates relative to the values of x,y of the white point) and $\Delta L$ (luminosity adjustments to Y). The magnitude of the adjustments to Yxy scale linearly to zero as the value of the x,y approaches the value of $(x,y)_{wp}$, i.e., the white point, and the adjustments to Y must scale linearly as the value of Y approaches 0. Thus, there is a unique set of three correction levels to Yxy, $\Delta\theta$, $\Delta S$, and $\Delta L$ for each region of color in the device color space, i.e., a set of three corrections for R, G, B, C, M, and Y that are performed in chromaticity space.

For embodiments where the second method transformation is used in combination with the first method transformation (FIGS. 8A and 8B, for example) the default values for $\Delta\theta$, $\Delta S$, and $\Delta L$ are 0 if the color matching results from the first method transformation for correcting XYZ->X'Y'Z' are sufficient. However, the second method transformation permits small second order corrections (X'Y'Z'->X"Y"Z") and thus more accurate color matching to be achieved when the results produced by the first method transformation are not sufficient.

To determine the optimal correction levels for $\Delta\theta$, $\Delta S$, and $\Delta L$, the magnitude and direction of the corrections can be estimated using a method similar to that described in FIG. 5. For example, by correcting display profile A-> display profile A' in the desired directions of improvement and then converting colors from the corrected display profile A'-> display profile A. For example, if the user desires to shift the hue of the yellow towards red, a value of –0.03 can be used for $\Delta\theta$ in the vicinity of yellow. If the user confirms that the desired result has occurred, the RGB profile of the display can be corrected in an inverse manner to ensure that images rendered to the screen will have the desired red shift in the yellows. This can be accomplished by adjusting the display profile A with a value of $\Delta\theta$ in yellow that is +0.1 to provide the appropriate inverse correction.

Referring again to FIG. 13, linear device-dependent coordinates are calculated from the raw device-dependent coordinates (146). If the output device is a CRT, for example, the linear device-dependent coordinates for the device-dependent display profile are calculated so that:

RGB->$R_L G_L B_L$.

These linear device-dependent coordinates are then used to calculate the correction factors as described below. To calculate the linear $R_L G_L B_L$ values from the raw RGB values, the linear $R_L G_L B_L$ data is calculated to be the corrected values of RGB that achieve accurate predictions of XYZ when multiplied by the appropriate RGB->XYZ matrix as described above with respect to the first method transformation. In the case of a CRT, linear $R_L G_L B_L$ values are typically calculated by a form of gamma curve, i.e., $R^\gamma$, where γ is approximately equal to 2. More complex functions such as the following functions may result in greater accuracy or for LCD systems:

$$R_L = f_R(R, \alpha_{iR})$$

$$G_L = f_G(G, \alpha_{iG})$$

$$B_L = f_B(B, \alpha_{iB})$$

Where f is the gamma function, R, G, and B are the relevant RGB values and $\alpha_i$ are the parameters used to describe the intensity function for the particular channel, R, G, or B.

In one embodiment, the chromatic corrections to the device-independent coordinates are applied in a piecewise fashion. Each unique set of correction levels and each unique correction factor is applied piecewise in the corresponding specific region of color. In other words, the group of chromatic corrections for a particular region of color are applied only when certain boundary conditions are satisfied (148). For example, referring now to FIG. 15, the region 204 associated with the primary color red is indicated by lines 206 and 208. This region satisfies the boundary condition:

$$R_L > G_L \text{ and } R_L > B_L.$$

Again, the group of chromatic corrections corresponding to the region of red (R) are only applied to the device-independent coordinates if the boundary conditions for that region are satisfied.

Similarly, each other primary color, i.e., green and blue, as well as each secondary color cyan, magenta, and yellow have respective sets of boundary conditions that can be defined as:

Green: $G_L > R_L$ and $G_L > B_L$

Blue: $B_L > R_L$ and $B_L > G_L$

Cyan: $G_L > R_L$ and $B_L > R_L$

Magenta: $B_L > G_L$ and $R_L > G_L$

Yellow: $R_L > B_L$ and $G_L > B_L$.

Figure 15:
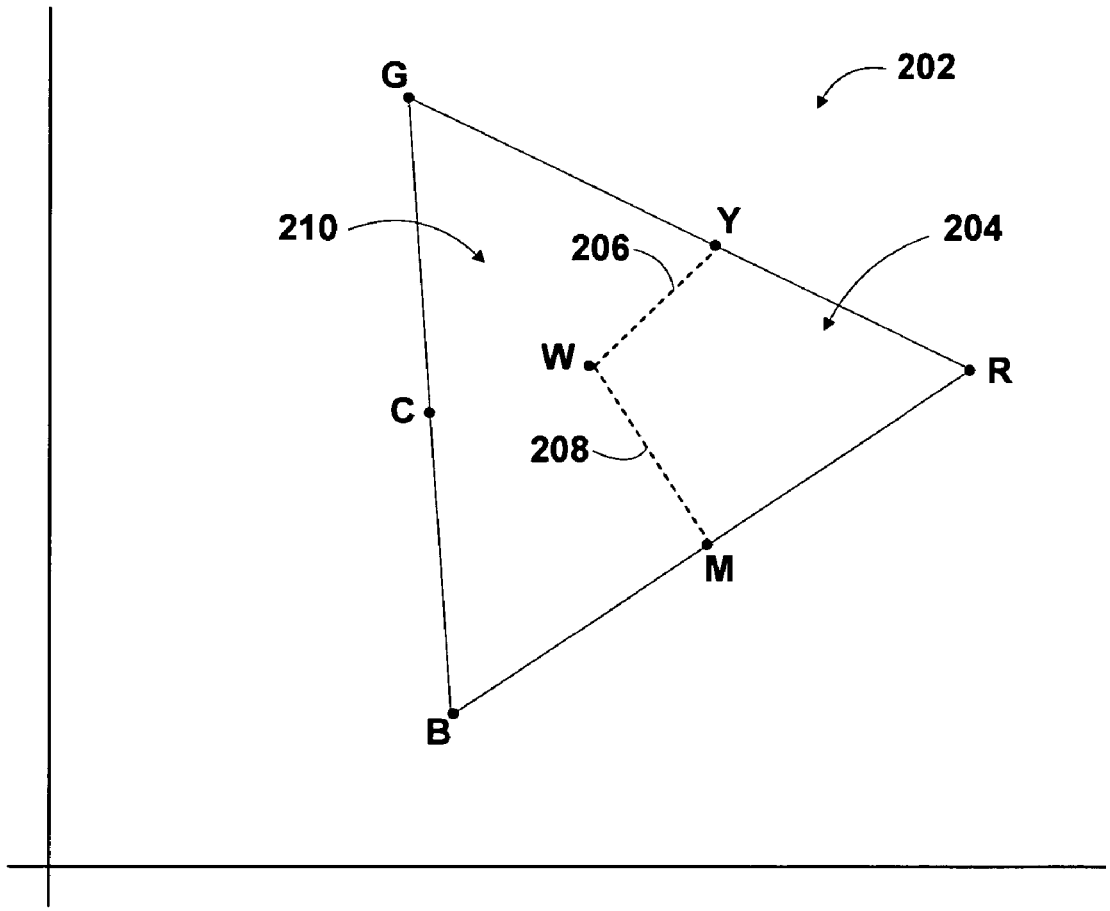

As another example, the region 210 defined by the boundary conditions for the secondary color cyan (C=G+B) is also shown in FIG. 15.

Referring again to FIG. 13, the correction factors for each of the primary colors and for each of the secondary colors are calculated using the device-dependent display profile (150). Each correction factor is calculated as a piecewise linear correction function of the linear device-dependent coordinates. Thus, each region of color has its own corresponding correction factor based on a piecewise linear correction function. For example, the correction factor $\beta_R$ for Yxy values in the region of red can be defined as:

$$\beta_R = \frac{(R_L - |G_L - B_L|)}{R_L}.$$

Similarly, the correction factors for the green and blue primary regions of color can be defined as:

$$\beta_G = \frac{(G_L - |R_L - B_L|)}{G_L}$$

$$\beta_B = \frac{(B_L - |G_L - R_L|)}{B_L}.$$

In addition, the secondary correction factors for each of the secondary colors cyan, magenta and yellow can be defined as:

$$\beta_C = 1.0 - \frac{|G_L - B_L|}{\max(G_L, B_L)}$$

$$\beta_M = 1.0 - \frac{|R_L - B_L|}{\max(R_L, B_L)}$$

$$\beta_Y = 1.0 - \frac{|G_L - R_L|}{\max(G_L, R_L)}.$$

The device-independent XYZ coordinates are next converted to cylindrical Yxy coordinates (152). Then, the actual adjustment (Δxy) for each point x,y in the color space is calculated (154). The values of Δ(xy) are calculated relative to the white point $(xy)_{wp}$ defined as follows:

$$x = X/(X+Y+Z)$$

$$y = Y/(X+Y+Z)$$

$$\Delta x = x - x_{wp}$$

$$\Delta y = y - y_{wp}$$

The correction levels, correction factors, and Δ(xy) are then applied in the corresponding regions of color to produce corrected Y'x'y' coordinates (156). For example, the corrected values of Δ(xy) Δx' and Δy' and the recomputed Y'x'y' in the region of red are defined by:

$$\Delta x' = (1.0 + \beta_R \Delta S_R)(\Delta x(1 - (\beta_R \Delta \theta)^2) - \Delta y \beta_R \Delta \theta)$$

$$\Delta y' = (1.0 + \beta_R \Delta S_R)(\Delta x \beta_R \Delta \theta + \Delta y(1 - (\beta_R \Delta \theta)^2))$$

$$x' = x_{wp} + \Delta x'$$

$$y' = y_{wp} + \Delta y'$$

$$Y' = Y(1.0 + \beta_R \Delta L_R (\Delta x^2 + \Delta y^2)^{1/2})$$

The above equations also apply to each of the other primary color regions green and blue as well as to each of the secondary color regions cyan, magenta and yellow by substituting their respective correction angle Δθ, saturation correction ΔS, luminance correction ΔL, and correction factor β.

Finally, the corrected Y'x'y' coordinates are converted back to result in the chromatically corrected device-independent coordinates X"Y"Z" (158).

The second method transformation may be used for scanner and digital camera profiling. Typically, there are many trade-offs between natural appearance and gray balance for scanner and digital camera ICC profiles and the ability to convert RGB->XYZ or L*a*b* accurately for specific objects in an image, such as a car or a box of detergent. A saturated red or blue object may have inaccurate predictions of color that are 20 ΔE or more. The second method transformation may permit adequate correction to be applied to a generic RGB profile for a scanner or digital camera in order to preserve gray balance and good overall image integrity, while improving the predictive conversion of RGB->XYZ or L*a*b* for a specific object in an image of intense color.

EXAMPLE 4

The following excerpt of C++ code shows one example embodiment of a method for determining a correction factor based on a device-dependent display profile.

```
double crtModel::calcCorrFactor (const vRGB<double>& rgbVal,int corrColor)
{
double corrFactor;
corrFactor = 0.0;
if (corrColor == iRED)
{
if (rgbVal.r( ) > rgbVal.g( ) && rgbVal.r( ) > rgbVal.b( ))
{
corrFactor = (rgbVal.r( ) - abs(rgbVal.g( )-rgbVal.b( )))/rgbVal.r( );
}
else
corrFactor = 0.0;
}
else if (corrColor == iGRE)
{
if (rgbVal.g( ) > rgbVal.r( ) && rgbVal.g( ) > rgbVal.b( ))
{
corrFactor = (rgbVal.g( ) - abs(rgbVal.r( )-rgbVal.b( )))/rgbVal.g( );
}
else
corrFactor = 0.0;
}
else if (corrColor == iBLU)
{
if (rgbVal.b( ) > rgbVal.g( ) && rgbVal.b( ) > rgbVal.r( ))
{
corrFactor = (rgbVal.b( ) - abs(rgbVal.g( )-rgbVal.r( )))/rgbVal.b( );
}
else
corrFactor = 0.0;
}
```

```
-continued else if (corrColor == iCYAN)
{
if (rgbVal.g( ) > rgbVal.r( ) && rgbVal.b( ) > rgbVal.r( ))
{
corrFactor = 1.0 - abs(rgbVal.g( )-rgbVal.b( ))/
max(rgbVal.g( ),rgbVal.b( ));
}
else
corrFactor = 0.0;
}
else if (corrColor == iMAG)
{
if (rgbVal.r( ) > rgbVal.g( ) && rgbVal.b( ) > rgbVal.g( ))
{
corrFactor = 1.0 - abs(rgbVal.r( )-rgbVal.b( ))/
max(rgbVal.r( ),rgbVal.b( ));
}
else
corrFactor = 0.0;
}
else if (corrColor == iYELL)
{
if (rgbVal.r( ) > rgbVal.b( ) && rgbVal.g( ) > rgbVal.b( ))
{
corrFactor = 1.0 - abs(rgbVal.g( )-rgbVal.r( ))/
max(rgbVal.g( ),rgbVal.r( ));
}
else
corrFactor = 0.0;
}
return(corrFactor);
}
```

EXAMPLE 5

The following excerpt of C++ code shows one example embodiment for calculating a corrected X"Y"Z" using a correction factor calculated based on a device-dependent display profile, for example, the correction factor obtained using the embodiment described in EXAMPLE 4.

```
XYZ crtModel::correctXYZ(const XYZ& xyzVal,double theta,double sat, double Ycorr,
double corrFactor)
{
XYZ retXYZval;
double xValOld, yValOld, xDeltaValNew, yDeltaValNew, xDeltaValOld,
yDeltaValOld,xD50, yD50,xValNew,yValNew,Y_old,Y_new;
double corrTheta,corrSat,corrY;
corrTheta = theta*corrFactor;
corrSat = 1.0 + sat*corrFactor;
corrY = Ycorr*corrFactor;
Y_old = xyzVal.y( );
xValOld = xyzVal.x( )/(xyzVal.x( )+xyzVal.y( )+xyzVal.z( ));
yValOld = xyzVal.y( )/(xyzVal.x( )+xyzVal.y( )+xyzVal.z( ));
xD50 = xyzD50White.x( )/(xyzD50White.x( )+xyzD50White.y( )+xyzD50White.z( ));
yD50 = xyzD50White.y( )/(xyzD50White.x( )+xyzD50White.y( )+xyzD50White.z( ));
xDeltaValOld = xValOld - xD50;
yDeltaValOld = yValOld - yD50;
xDeltaValNew = corrSat*(xDeltaValOld*(1-corrTheta*corrTheta) - yDeltaValOld *
corrTheta);
yDeltaValNew = corrSat*(xDeltaValOld*corrTheta + yDeltaValOld * (1-
corrTheta*corrTheta));
xValNew = xD50+xDeltaValNew;
yValNew = yD50+yDeltaValNew;
Y_new = Y_old * (1.0 + corrY * sqrt(xDeltaValOld*xDeltaValOld +
yDeltaValOld*yDeltaValOld));
retXYZval.x(xValNew * Y_new/yValNew);
retXYZval.y(Y_new);
retXYZval.z((1-xValNew-yValNew) * Y_new/yValNew);
return(retXYZval);
}
```

It shall be understood that the snippets of C++ code shown in EXAMPLE 4 and EXAMPLE 5 are for illustrative purposes only, and that the present invention is not limited to the particular implementations given therein.

A number of implementations of the present invention have been described. For instance, color transformation techniques have been described for transforming device-independent coordinates based on a device-dependent display profile to facilitate color matching. One or more implementations may be practiced with or without other color imaging techniques to realize soft proofing. Nevertheless, it will be understood that various modifications may be made without departing from the spirit and scope of the invention. For instance, the transformation techniques may be implemented to improve color matching between any two imaging devices. The transformation techniques may also be implemented to improve color matching between two printers or between two displays.

In addition, rather than performing a manual and iterative optimization to determine the optimal correction levels of the angle, saturation, and luminance for RGBCMY, these values may be automatically calculated by an error minimizing routine.

These and other modifications can be made to the description above. Accordingly, other implementations and embodiments are within the scope of the following claims.

The invention claimed is:

1. A method comprising:
   determining chromaticity corrections corresponding to red, green, blue, cyan, magenta and yellow regions of color in a linear device-dependent coordinate space associated with an output device;
   applying the chromaticity corrections to device-independent coordinates throughout said corresponding regions of color to produce chromatically corrected device-independent coordinates; and
   displaying colors on a display based on the chromatically corrected device-independent coordinates.

2. The method of claim 1 wherein determining chromaticity corrections further comprises calculating correction factors corresponding to each region of color that are piecewise linear correction functions within the corresponding regions of color.

3. The method of claim 2 wherein each piecewise linear correction function operates on the linear device-dependent coordinates within the corresponding region of color.

4. The method of claim 3 wherein the linear device-dependent coordinates comprise linear RGB coordinates.

5. The method of claim 1 wherein determining chromaticity corrections further comprises calculating a set of correction levels, wherein the correction levels correspond to adjustments to the hue, saturation, and brightness for the corresponding regions of color for the chromaticity corrections.

6. The method of claim 5 wherein the device-independent coordinates comprise coordinates in tristimulus space.

7. The method of claim 5 wherein the device-independent coordinates comprise coordinates in chromaticity space.

* * * * *